(12) United States Patent
Parr et al.

(10) Patent No.: US 6,887,606 B2
(45) Date of Patent: May 3, 2005

(54) FUEL CELL SYSTEM METHOD AND APPARATUS EMPLOYING OXYGEN SENSOR

(75) Inventors: Robert Kenneth Parr, Calgary (CA); Brian Wells, Vancouver (CA)

(73) Assignee: Ballard Power Systems Inc., Burnaby (CA)

(*) Notice: Subject to any disclaimer, the term of this patent is extended or adjusted under 35 U.S.C. 154(b) by 113 days.

(21) Appl. No.: 09/916,240

(22) Filed: Jul. 25, 2001

(65) Prior Publication Data

US 2003/0022037 A1 Jan. 30, 2003

(51) Int. Cl.⁷ .............................................. H01M 8/04
(52) U.S. Cl. ......................... 429/22; 429/24; 700/292; 700/299
(58) Field of Search .................... 429/22, 24; 700/266, 700/292, 299

(56) References Cited

U.S. PATENT DOCUMENTS

| | | | |
|---|---|---|---|
| 2,988,656 A | 6/1961 | Grobel | 310/53 |
| 4,078,893 A | 3/1978 | Gilman et al. | 23/253 TP |
| 4,197,675 A | 4/1980 | Kelly | 49/31 |
| 5,074,137 A | 12/1991 | Harris et al. | 73/31.02 |
| 5,132,663 A | 7/1992 | Strobl et al. | 340/438 |
| 5,199,396 A | 4/1993 | Shelef et al. | 123/198 D |
| 5,392,873 A | 2/1995 | Masuyama et al. | 180/68.5 |
| 5,397,655 A | 3/1995 | Bette et al. | 429/13 |
| 5,478,662 A | 12/1995 | Strasser | 429/13 |
| 5,763,113 A | 6/1998 | Meltser et al. | 429/13 |
| 6,124,054 A | 9/2000 | Gorman et al. | 429/34 |
| 6,140,820 A | 10/2000 | James | 324/434 |
| 6,159,626 A | 12/2000 | Keskula et al. | 429/22 |
| 6,290,594 B1 | 9/2001 | Osborne | 454/75 |
| 6,461,751 B1 * | 10/2002 | Boehm et al. | 429/22 X |
| 6,492,043 B1 * | 12/2002 | Knights et al. | 429/22 X |
| 6,497,971 B1 * | 12/2002 | Reiser | 429/22 X |
| 6,519,510 B1 * | 2/2003 | Margiott et al. | 700/299 |
| 2001/0018142 A1 | 8/2001 | Kato et al. | 429/22 |
| 2003/0003333 A1 * | 1/2003 | Haridos | 429/22 |

FOREIGN PATENT DOCUMENTS

| | | | | |
|---|---|---|---|---|
| EP | 982 788 A2 | 3/2000 | | |
| EP | 1 037 041 A2 | 9/2000 | | |
| JP | 60-158557 | * | 8/1985 | H01M/8/04 |
| JP | 8-250139 | * | 9/1996 | H01M/8/04 |
| WO | WO 00/02282 | 1/2000 | | |
| WO | WO 00/74162 A1 | 12/2000 | | |
| WO | WO 01/26174 A1 | 4/2001 | | |

OTHER PUBLICATIONS

Abstract of JP 60–212966, esp@cenet database, Oct. 25, 1985.

Abstract of JP 63–241876, esp@cenet database, Oct. 7, 1988.

Abstract of JP 2–078159, esp@cenet database, Mar. 19, 1990.

Abstract of JP 4–115467, esp@cenet database, Apr. 16, 1992.

(Continued)

*Primary Examiner*—Stephen J. Kalafut
(74) *Attorney, Agent, or Firm*—Seed IP Law Group PLLC

(57) ABSTRACT

A controller in a fuel cell system performs various operating parameter checks at a predefined schedule, including one or more of a stack current check; a stack voltage check; a cell voltage check; a purge cell check; an oxygen concentration check; a hydrogen concentration check; a stack temperature check; an ambient air temperature check; a fuel pressure check; and an airflow rate check; a hydrogen sensor heater check; a battery voltage check; a microcontroller self-check; and/or toggling a watchdog. The frequency of the checks are set relative to achieve an efficient control of the fuel cell system by selectively distributing the load on the microcontroller.

25 Claims, 26 Drawing Sheets

OTHER PUBLICATIONS

Abstract of JP 4–220955, esp@cenet database, Aug. 11, 1992.
Abstract of JP 6–084536, esp@cenet database, Mar. 25, 1994.
Abstract of JP 7–325075, esp@cenet database, Dec. 12, 1995.
Abstract of JP 8–162138, esp@cenet database, Jun. 21, 1996.
Abstract of JP 8–185879, esp@cenet database, Jul. 16, 1996.
Abstract of JP 2000–009685, espacenet database, Jan. 14, 2000.
Jake de Vaal and Harvindra Deo, "Fuel Cell Ambient Enviroment Monitoring and Control Apparatus and Method," U.S. Application No. 09/916,241, Jul. 25, 2001.
Robert Kenneth Parr, "Fuel Cell Controller Self Inspection," U.S. Application No. 09/916,117, Jul. 25, 2001.
Brian Wells, "Fuel Cell Anomaly Detection Method and Apparatus," U.S. Application No. 09/916,115, Jul. 25, 2001.
Russell Howard Barton et al., "Fuel Cell Purging Method and Apparatus," U.S. Application No. 09/916,211, Jul. 25, 2001.
Brian Wells et al., "Fuel Cell Resuscitation Method and Apparatus," U.S. Application No. 09/916,213, Jul. 25, 2001.
David S. Manery, "Fuel Cell System Automatic Power Switching Method Apparatus," U.S. Application No. 09/916,239, Jul. 25, 2001.
Russell Howard Barton and Tan Duc Uong, "Product Water Pump for Fuel Cell System," U.S. Application No. 09/916,118, Jul. 25, 2001.
Brian Wells and Kenneth W. Strang, "Fuel Cell System Having a Hydrogen Sensor," U.S. Application No. 09/916,212, Jul. 25, 2001.

* cited by examiner

100

System Task Scheduling Frequency

| System Task Description | Frequency in ms |
|---|---|
| Monitor Stack Current and Set Air Compressor Duty Cycle | 50 |
| Monitor Stack Voltage | 100 |
| Monitor Purge Cell Voltage | 100 |
| Monitor Cell Voltage Monitor Check | 200 |
| Transmit Status Message | 200 |
| Toggle Hardware Watchdog Circuit | 200 |
| Perform One Dynamic System Self Test Suite Test | 200 |
| Monitor Stack Temperature | 1000 |
| Adjust Cooling Fan Duty Cycle | 1000 |
| Monitor Oxygen Concentration Sensor | 1000 |
| Monitor Hydrogen Leak Sensor | 1000 |
| Monitor Hydrogen Fuel Pressure Sensor | 1000 |
| Monitor Ambient Air Temperature | 1000 |
| Monitor Air Flow Feedback Sensor | 1000 |
| Monitor Air Compressor 12/3 Voltage Rail Feedback | 1000 |
| Monitor Battery Voltage | 1000 |
| Monitor DAC Channel A Air Compressor Feedback Voltage | 1000 |
| Monitor DAC Channel B Cooling Fan Feedback Voltage | 1000 |
| Monitor H2 Sensor Wheatstone Bridge Leg+ | 1000 |

*Fig. 9*

System/Task Scheduling Strategy

| Slot | Task 1 | Task 2 | Task 3 | Task 4 |
|---|---|---|---|---|
| 1 | Monitor Stack Current | Monitor Stack Voltage | Cell Voltage Check | Toggle Watchdog |
| 2 | Monitor Stack Current | Monitor Purge Cell | Transmit Status | |
| 3 | Monitor Stack Current | Monitor Stack Voltage | Monitor Stack Temp | Monitor D/A Channel |
| 4 | Monitor Stack Current | Monitor Purge Cell | Calc Fan Duty Cycle | |
| 5 | Monitor Stack Current | Monitor Stack Voltage | Cell Voltage Check | Toggle Watchdog |
| 6 | Monitor Stack Current | Monitor Purge Cell | Transmit Status | |
| 7 | Monitor Stack Current | Monitor Stack Voltage | Monitor O2 Sensor | Monitor D/A Channel |
| 8 | Monitor Stack Current | Monitor Purge Cell | Monitor H2 Sensor | |
| 9 | Monitor Stack Current | Monitor Stack Voltage | Cell Voltage Check | Toggle Watchdog |
| 10 | Monitor Stack Current | Monitor Purge Cell | Transmit Status | |
| 11 | Monitor Stack Current | Monitor Stack Voltage | Monitor Fuel Pressure | System Self Test |
| 12 | Monitor Stack Current | Monitor Purge Cell | Monitor Air Temp | |
| 13 | Monitor Stack Current | Monitor Stack Voltage | Cell Voltage Check | Toggle Watchdog |
| 14 | Monitor Stack Current | Monitor Purge Cell | Transmit Status | |
| 15 | Monitor Stack Current | Monitor Stack Voltage | Monitor Air Flow | System Self Test |
| 16 | Monitor Stack Current | Monitor Purge Cell | Monitor 12 Volt Rail | |
| 17 | Monitor Stack Current | Monitor Stack Voltage | Cell Voltage Check | Toggle Watchdog |
| 18 | Monitor Stack Current | Monitor Purge Cell | Transmit Status | |
| 19 | Monitor Stack Current | Monitor Stack Voltage | Monitor Battery Voltage | System Self Test |
| 20 | Monitor Stack Current | Monitor Purge Cell | | |

Fig. 10

FUEL CELL SYSTEM METHOD AND APPARATUS EMPLOYING OXYGEN SENSOR

BACKGROUND OF THE INVENTION

1. Technical Field

The present invention relates to fuel cells, and particularly to the operation of fuel cell systems.

2. Description of the Related Art

Electrochemical fuel cells convert fuel and oxidant to electricity. Solid polymer electrochemical fuel cells generally employ a membrane electrode assembly ("MEA") which comprises an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit. Typically, a number of MEAs are serially coupled electrically to form a fuel cell stack having a desired power output.

In typical fuel cells, the MEA is disposed between two electrically conductive fluid flow field plates or separator plates. Fluid flow field plates have at least one flow passage formed in at least one of the major planar surfaces thereof. The flow passages direct the fuel and oxidant to the respective electrodes, namely, the anode on the fuel side and the cathode on the oxidant side. The fluid flow field plates act as current collectors, provide support for the electrodes, provide access channels for the fuel and oxidant to the respective anode and cathode surfaces, and provide channels for the removal of reaction products, such as water, formed during operation of the cell.

Due to their zero- or low-emission nature, and ability to operate using renewable fuels, the use of fuel cells as primary and/or backup power supplies is likely to become increasingly prevalent. For example, a fuel cell stack can serve as an uninterruptible power supply for computer, medical, or refrigeration equipment in a home, office, or commercial environment. Other uses are of course possible. Operating and environmental factors relevant to efficient fuel cell system operation may include the concentration of hydrogen in the surrounding environment, the concentration of oxygen in the surrounding environment, fuel cell stack temperature, ambient air temperature, current flow through the fuel cell stack, voltage across the fuel cell stack, and voltage across the MEAs. These factors become increasingly relevant when the fuel cell operating environment is a human habitable space with a low air flow exchange rate and/or when the space is small, such as a utility room or closet.

SUMMARY OF THE INVENTION

Fuel cell systems have a variety of performance characteristics, which can be monitored and used to increase performance, and or to determine when to shut down fuel cell stack operation. It would be difficult to simultaneously monitor all performance characteristics. Consequently, there is a need for improved control systems for fuel cell systems, particularly for fuel cell systems that operate in enclosed environments and/or habitable environments, and for methods of controlling such fuel cell systems according to a schedule.

In one aspect, a fuel cell system includes a fuel cell stack, an oxygen concentration sensor, a hydrogen concentration sensor, a stack temperature sensor, a fuel cell stack current sensor, a fuel cell stack voltage sensor, and a microcontroller coupled to receive various signals from the sensors and to compare the received values to threshold values on a predefined schedule during normal operation of the fuel cell system. The microcontroller can, for example, be configured to shut down fuel cell operation when a measured operating parameter exceeds or falls below a threshold value.

In another aspect, a microcontroller is configured to operate a fuel cell system by performing checks of a stack current, stack voltage, and cell voltage on a predefined schedule during normal operation of the fuel cell system. The microcontroller can, for example, be configured to perform checks of the stack current twice as often as the stack voltage, and twice as often as checks of the voltage across a purge cell portion of the fuel cell stack. The microcontroller can, for example, be further configured to perform checks of an oxygen concentration, hydrogen concentration, and stack temperature.

In a further aspect, computer-readable media, such as an on-chip flash memory of a microcontroller, can carry instructions for causing the microcontroller to operate a fuel cell system by performing checks of a stack current, stack voltage, and cell voltage on a predefined schedule during normal operation of the fuel cell system. The computer-readable media can carry instructions for causing the microcontroller to further perform a check of an oxygen concentration, hydrogen concentration, stack temperature, ambient air temperature, fuel pressure, airflow rate, and/or self-check of the microcontroller. Additionally, or alternatively, the computer-readable media can contain instructions for causing the microcontroller to toggle a watchdog timer or circuit.

In a further aspect, a method of operating a fuel cell system includes performing a check of a stack current at a first frequency and performing a check of a stack voltage and/or a check of a voltage across a purge cell portion of the fuel cell stack at a second frequency equal to half of the first frequency. Additionally, the method can include performing a check of the voltage across each fuel cell or fuel cell pair, transmitting a status message, toggling a watchdog circuit, and/or performing a microcontroller self-test suite at a third frequency equal to one quarter of the first frequency. Further, the method can include performing a check of a stack temperature, adjusting a cycle of a cooling fan, a check of an oxygen concentration, a check of a hydrogen concentration, a check of a fuel pressure, a check of an ambient air temperature, a check of an airflow rate, a check of a battery voltage, and/or a check of a hydrogen sensor heater at the fourth frequency equal to one one-twentieth of the first frequency.

In yet a further aspect, a method of distributing load on a microcontroller in a fuel cell system includes dividing a time period into slots, during which a number of tasks can be executed by the microcontroller, scheduling a check of a stack current to each of the slots, scheduling a check of a stack voltage to every other slot, and scheduling a check of a cell voltage to alternate ones of the slots from the check of the stack voltage.

BRIEF DESCRIPTION OF THE DRAWINGS

In the drawings, identical reference numbers identify similar elements or acts. The sizes and relative positions of elements in the drawings are not necessarily drawn to scale.

For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, have been selected solely for ease of recognition in the drawings.

FIG. 9 is a table representing various fuel cell system operations and the frequency of performance of each operation represented in microseconds.

FIG. 10 is a table showing an exemplary order for execution of the various fuel cell system operations of FIG. 3, scheduled to satisfy the frequency indicated in FIG. 3.

DETAILED DESCRIPTION OF PREFERRED EMBODIMENT

In the following description, certain specific details are set forth in order to provide a thorough understanding of various embodiments of the invention. However, one skilled in the art will understand that the invention may be practiced without these details. In other instances, well known structures associated with fuel cells, microcontrollers, sensors, and actuators have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

Fuel Cell System Overview

Figure 1:
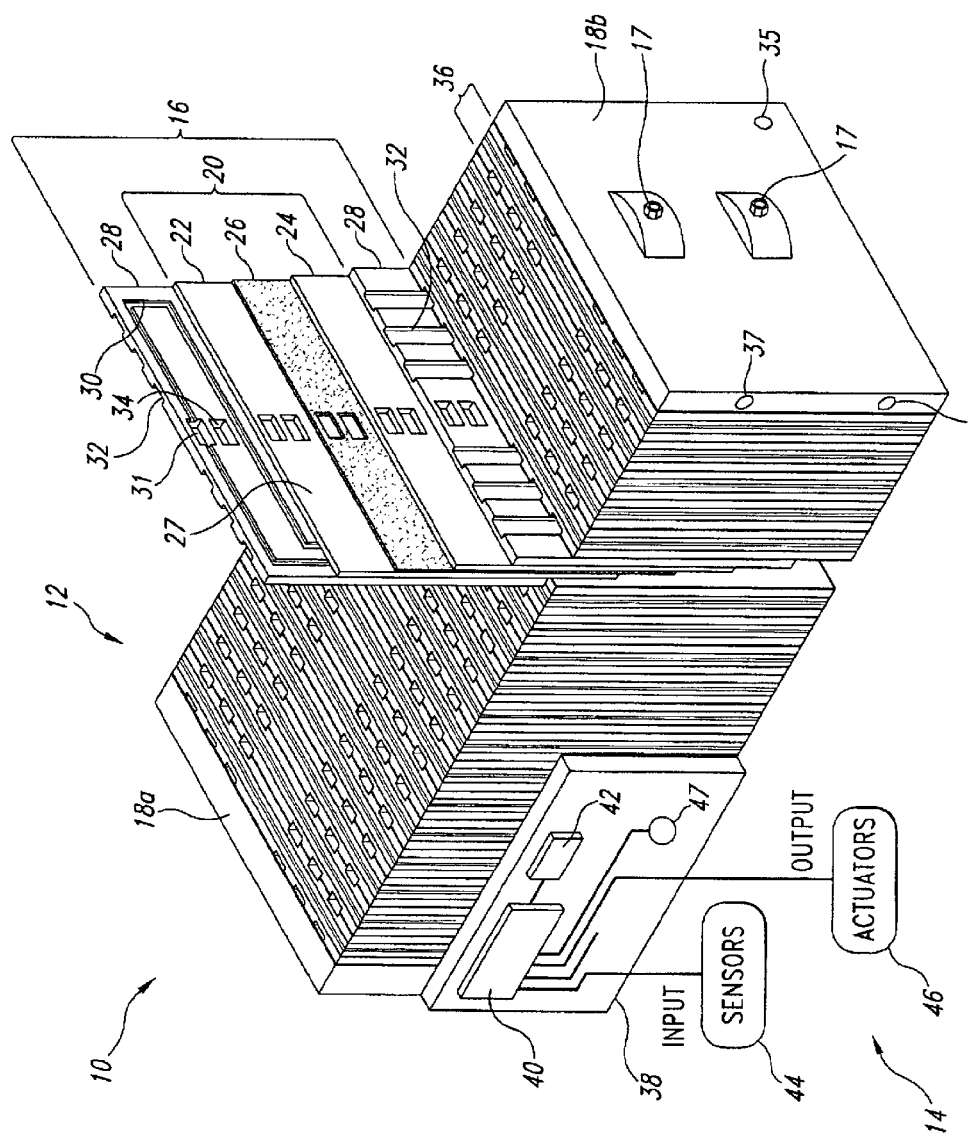
FIG. 1 is an isometric, partially exploded, view of a fuel cell system including a fuel cell stack and controlling electronics including a fuel cell ambient environment monitoring and control system.

FIG. 1 shows a portion of a fuel cell system 10, namely, a fuel cell stack 12 and an electronic fuel cell monitoring and control system 14. Fuel cell stack 12 includes a number of fuel cell assemblies 16 arranged between a pair of end plates 18a, 18b, one of the fuel cell assemblies 16 being partially removed from fuel cell stack 12 to better illustrate the structure of fuel cell assembly 16. Tie rods (not shown) extend between end plates 18a, 18b and cooperate with fastening nuts 17 to bias end plates 18a, 18b together by applying pressure to the various components to ensure good contact therebetween.

Each fuel cell assembly 16 includes a membrane electrode assembly 20 including two electrodes, the anode 22 and the cathode 24, separated by an ion exchange membrane 26. Electrodes 22, 24 can be formed from a porous, electrically conductive sheet material, such as carbon fiber paper or cloth, that is permeable to the reactants. Each of electrodes 22, 24 is coated on a surface adjacent the ion exchange membrane 26 with a catalyst 27, such as a thin layer of platinum, to render each electrode electrochemically active.

The fuel cell assembly 16 also includes a pair of separators or flow field plates 28 sandwiching membrane electrode assembly 20. In the illustrated embodiment, each of the flow field plates 28 includes one or more reactant channels 30 formed on a planar surface of flow field plate 28 adjacent an associated one of the electrodes 22, 24 for carrying fuel to anode 22 and oxidant to cathode 24, respectively. (Reactant channel 30 on only one of flow field plates 28 is visible in FIG. 1.) The reactant channels 30 that carry the oxidant also carry exhaust air and product water away from cathode 24. As will be described in more detail below, fuel stack 12 is designed to operate in a dead-ended fuel mode, thus substantially all of the hydrogen fuel supplied to it during operation is consumed, and little if any hydrogen is carried away from stack 12 in normal operation of system 10. However, embodiments of the present invention can also be applicable to fuel cell systems operating on dilute fuels which are not dead-ended.

In the illustrated embodiment, each flow field plate 28 preferably includes a plurality of cooling channels 32 formed on the planar surface of the flow field plate 28 opposite the planar surface having reactant channel 30. When the stack is assembled, the cooling channels 32 of each adjacent fuel cell assembly 16 cooperate so that closed cooling channels 32 are formed between each membrane electrode assembly 20. The cooling channels 32 transmit cooling air through the fuel stack 12. The cooling channels are preferably straight and parallel to each other, and traverse each plate 28 so that cooling channel inlets and outlets are located at respective edges of plate 28.

While the illustrated embodiment includes two flow field plates 28 in each fuel cell assembly 16, other embodiments can include a single bipolar flow field plate (not shown) between adjacent membrane electrode assemblies 20. In such embodiments, a channel on one side of the bipolar plate carries fuel to the anode of one adjacent membrane electrode assembly 20, while a channel on the other side of the plate carries oxidant to the cathode of another adjacent membrane electrode assembly 20. In such embodiments, additional flow field plates 28 having channels for carrying coolant (e.g., liquid or gas, such as cooling air) can be spaced throughout fuel cell stack 12, as needed to provide sufficient cooling of stack 12.

End plate 18a includes a fuel stream inlet port (not shown) for introducing a supply fuel stream into fuel cell stack 12. End plate 18b includes a fuel stream outlet port 35 for discharging an exhaust fuel stream from fuel cell stack 12 that comprises primarily water and non-reactive components and impurities, such as any introduced in the supply fuel stream or entering the fuel stream in stack 12. Fuel stream outlet port 35 is normally closed with a valve in dead-ended operation. Although fuel cell stack 12 is designed to consume substantially all of the hydrogen fuel supplied to it during operation, traces of unreacted hydrogen may also be discharged through the fuel stream outlet port 35 during a purge of fuel cell stack 12, effected by temporarily opening a valve at fuel stream outlet port 35. Each fuel cell assembly 16 has openings formed therein to cooperate with corresponding openings in adjacent assemblies 16 to form internal fuel supply and exhaust manifolds (not shown) that extend the length of stack 12. The fuel stream inlet port is fluidly connected to fluid outlet port 35 via respective reactant channels 30 that are in fluid communication with the fuel supply and exhaust manifolds, respectively.

The end plate 18b includes an oxidant stream inlet port 37 for introducing supply air (oxidant stream) into fuel cell stack 12, and an oxidant stream outlet port 39 for discharging exhaust air from fuel cell stack 12. Each fuel cell assembly 16 has openings 31, 34, formed therein to cooperate with corresponding openings in adjacent fuel cell assemblies 16 to form oxidant supply and exhaust manifolds that extend the length of stack 12. The oxidant inlet port 37 is fluidly connected to the oxidant outlet port 39 via respective reactant channels 30 that are in fluid communication with oxidant supply and exhaust manifolds, respectively.

In one embodiment, the fuel cell stack 12 includes forty-seven fuel cell assemblies 16. (FIGS. 1 and 2 omit a number of the fuel cell assemblies 16 to enhance drawing clarity). The fuel cell stack 12 can include a greater or lesser number of fuel cell assemblies to provide more or less power, respectively.

Figure 2:
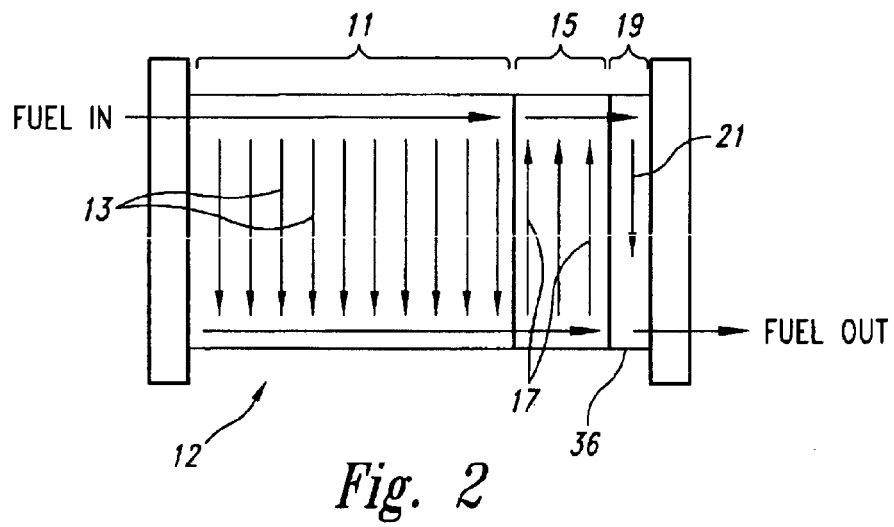
FIG. 2 is a schematic diagram representing fuel flow through a cascaded fuel cell stack of the fuel cell system of FIG. 1.

As shown in FIG. 2, fuel is directed through fuel cell stack 12 in a cascaded flow pattern. A first set 11 composed of the first forty-three fuel cell assemblies 16 are arranged so that fuel flows within the set in a concurrent parallel direction (represented by arrows 13) that is generally opposite the direction of the flow of coolant through fuel cell stack 12). Fuel flow through a next set 15 of two fuel cell assemblies 16 is in series with respect to the flow of fuel in the first set 11, and in a concurrent parallel direction within the set 15 (in a direction represented by arrows 17) that is generally concurrent with the direction of the flow of coolant through fuel cell stack 12. Fuel flow through a final set 19 of two fuel cells assemblies 16 is in series with respect to the first and second sets 11, 15, and in a concurrent parallel direction within the set 19 (in a direction represented by arrow 21) generally opposite the flow of coolant through the fuel cell stack 12. The oxidant is supplied to each of the forty-seven fuel cells in parallel, in the same general direction as the flow of coolant through the fuel cell stack 12.

The final set 19 of fuel cell assemblies 16 comprises the purge cell portion 36 of the fuel cell stack. The purge cell portion 36 accumulates non-reactive components which are periodically vented by opening a purge valve.

Each membrane electrode assembly 20 is designed to produce a nominal potential difference of about 0.6 V between anode 22 and cathode 24. Reactants (hydrogen and air) are supplied to electrodes 22, 24 on either side of ion exchange membrane 26 through reactant channels 30. Hydrogen is supplied to anode 22, where platinum catalyst 27 promotes its separation into protons and electrons, which pass as useful electricity through an external circuit (not shown). On the opposite side of membrane electrode assembly 20, air flows through reactant channels 30 to cathode 24 where oxygen in the air reacts with protons passing through the ion exchange membrane 26 to produce product water.

Fuel Cell System Sensors and Actuators

With continuing reference to FIG. 1, the electronic monitoring and control system 14 comprises various electrical and electronic components on a circuit board 38 and various sensors 44 and actuators 46 distributed throughout fuel cell system 10. The circuit board 38 carries a microprocessor or microcontroller 40 that is appropriately programmed or configured to carry out fuel cell system operation. Microcontroller 40 can take the form of an Atmel AVR RISC microcontroller available from Atmel Corporation of San Jose, Calif. The electronic monitoring and control system 14 also includes a persistent memory 42, such as an EEPROM portion of the microcontroller 40 or discrete nonvolatile controller-readable media.

Microcontroller 40 is coupled to receive input from sensors 44 and to provide output to actuators 46. The input and/or output can take the form of either digital and/or analog signals. A rechargeable battery 47 powers the electronic monitoring and control system 14 until fuel cell stack 12 can provide sufficient power to electronic monitoring and control system 14. Microcontroller 40 is selectively couplable between fuel cell stack 12 and battery 47 for switching power during fuel cell system operation and/or to recharge battery 47 during fuel cell operation.

Figure 3:
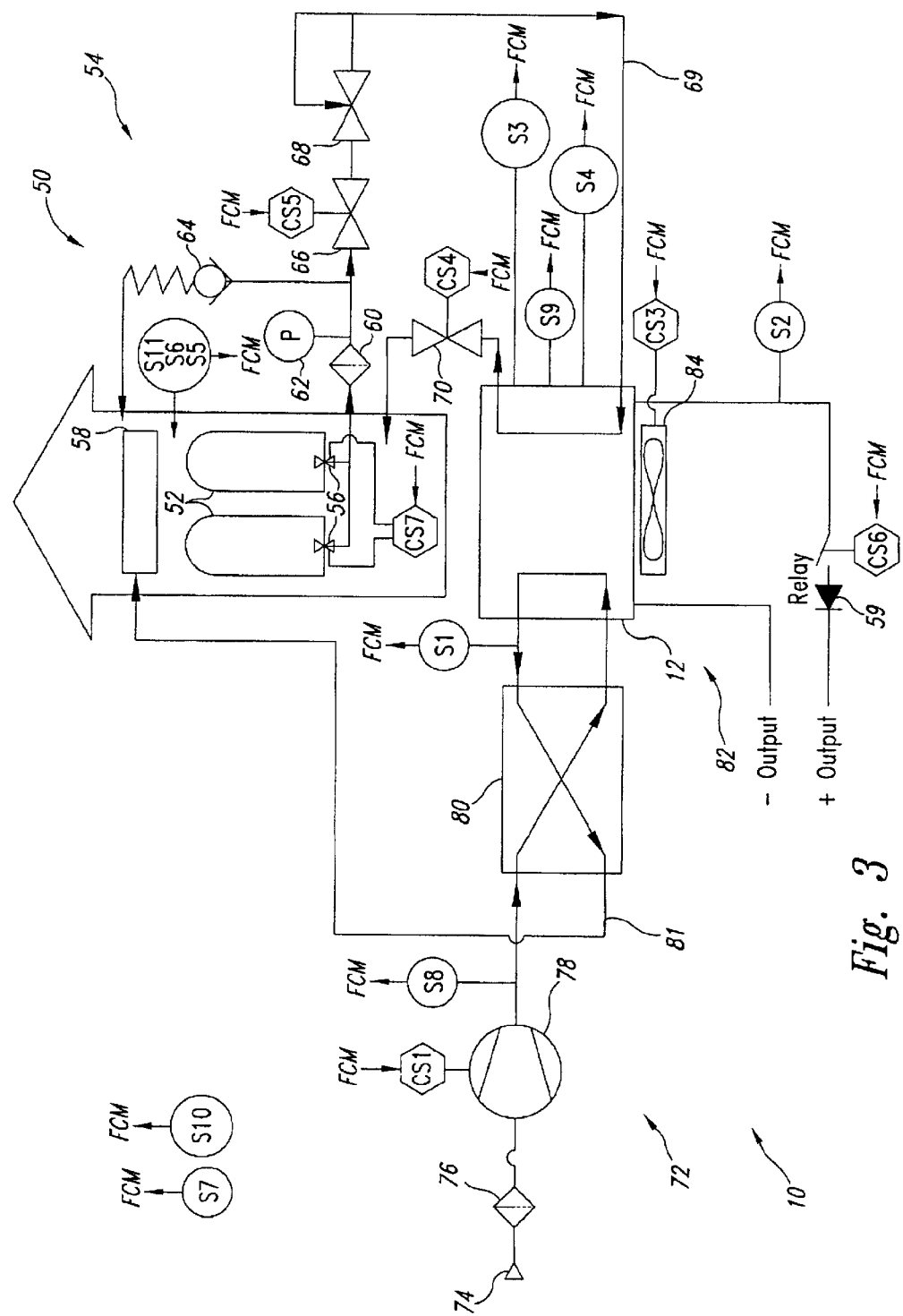
FIG. 3 is a schematic diagram of a portion of the fuel cell ambient environment monitoring and control system of FIG. 1.

FIG. 3 show various elements of fuel cell system 10 in further detail, and shows various other elements that were omitted from FIG. 1 for clarity of illustration.

With particular reference to FIG. 3, fuel cell system 10 provides fuel (e.g., hydrogen) to anode 22 by way of a fuel system 50. Fuel system 50 includes a source of fuel such as one or more fuel tanks 52, and a fuel regulating system 54 for controlling delivery of the fuel. Fuel tanks 52 can contain hydrogen, or some other fuel such as methanol. Alternatively, fuel tanks 52 can represent a process stream from which hydrogen can be derived by reforming, such as methane or natural gas (in which case a reformer is provided in fuel cell system 10).

Fuel tanks 52 each include a fuel tank valve 56 for controlling the flow of fuel from respective fuel tank 52. Fuel tank valves 56 may be automatically controlled by microcontroller 40, and/or manually controlled by a human operator. Fuel tanks 52 may be refillable, or may be disposable. Fuel tanks 52 may be integral to fuel system 50 and/or fuel cell system 10, or can take the form of discrete units. In this embodiment, fuel tanks 52 are hydride storage tanks. Fuel tanks 52 are positioned within the fuel cell system 10 such that they are heatable by exhaust cooling air warmed by heat generated by fuel cell stack 12. Such heating facilitates the release of hydrogen from the hydride storage media.

Fuel cell monitoring and control system 14 includes a hydrogen concentration sensor S5, hydrogen heater current sensor S6 and a hydrogen sensor check sensor S11. Hydrogen heater current sensor S6 can take the form of a current sensor that is coupled to monitor a hydrogen heater element that is an integral component of hydrogen concentration sensor S5. Hydrogen sensor check sensor S11 monitors voltage across a positive leg of a Wheatstone bridge in a hydrogen concentration sensor S5, discussed below, to determine whether hydrogen concentration sensor S5 is functioning.

Fuel tanks 52 are coupled to the fuel regulating system 54 through a filter 60 that ensures that particulate impurities do not enter fuel regulating system 54. Fuel regulating system 54 includes a pressure sensor 62 to monitor the pressure of fuel in fuel tanks 52, which indicates how much fuel remains in fuel tanks 52. A pressure relief valve 64 automatically operates to relieve excess pressure in fuel system 50. Pressure relief valve 64 can take the form of a spring and ball relief valve. A main gas valve solenoid CS5 opens and closes a main gas valve 66 in response to signals from the microcontroller 40 to provide fluid communication between the fuel tanks 52 and fuel regulating system 54. Additional solenoids CS7 control flow through the fuel tank valves 56. A hydrogen regulator 68 regulates the flow of hydrogen from fuel tanks 52. Fuel is delivered to the anodes 22 of the fuel cell assemblies 16 through a hydrogen inlet conduit 69 that is connected to fuel stream inlet port of stack 12.

Sensors 44 of fuel regulating system 54 monitor a number of fuel cell system operating parameters to maintain fuel cell system operation within acceptable limits. For example, a stack voltage sensor S3 measures the gross voltage across fuel cell stack 12. A purge cell voltage sensor S4 monitors the voltage across purge cell portion 36 (the final set 19 of fuel cell assemblies 16 in cascaded design of FIG. 2). A cell voltage checker S9 ensures that a voltage across each of the fuel cells 20 is within an acceptable limit. Each of the sensors S3, S4, S9 provide inputs to microcontroller 40, identified in FIG. 3 by arrows pointing toward the blocks labeled "FCM" (i.e., fuel cell microcontroller 40).

A fuel purge valve 70 is provided at fuel stream outlet port 35 of fuel cell stack 12 and is typically in a closed position when stack 12 is operating. Fuel is thus supplied to fuel cell stack 12 only as needed to sustain the desired rate of electrochemical reaction. Because of the cascaded flow design, any impurities (e.g., nitrogen) in the supply fuel stream tend to accumulate in purge cell portion 36 during operation. A build-up of impurities in purge cell portion 36 tends to reduce the performance of purge cell portion 36; should the purge cell voltage sensor S4 detect a performance drop below a threshold voltage level, microcontroller 40 may send a signal to a purge valve controller CS4 such as a solenoid to open the purge valve 36 and discharge the impurities and other non-reactive components that may have accumulated in purge cell portion 36 (collectively referred to as "purge discharge"). The venting of hydrogen by the purge valve 70 during a purge is limited to prevent the am monitoring and control system 14, discussed below, from triggering a failure or fault.

Fuel cell system 10 provides oxygen in an air stream to the cathode side of membrane electrode assemblies 20 by way of an oxygen delivery system 72. A source of oxygen or air 74 can take the form of an air tank or the ambient atmosphere. A filter 76 ensures that particulate impurities do not enter oxygen delivery system 72. An air compressor controller CS1 controls an air compressor 78 to provide the air to fuel cell stack 12 at a desired flow rate. A mass air flow sensor S8 measures the air flow rate into fuel cell stack 12, providing the value as an input to microcontroller 40. A humidity exchanger 80 adds water vapor to the air to keep the ion exchange membrane 26 moist. Humidity exchanger 80 also removes water vapor which is a byproduct of the electrochemical reaction. Excess liquid water is provided to an evaporator 58 via conduit 81.

The fuel cell system 10 removes excess heat from fuel cell stack 12 and uses the excess heat to warm fuel tanks 52 by way of a cooling system 82. Cooling system 82 includes a fuel cell temperature sensor S1, for example a thermister that monitors the core temperature of fuel cell stack 12. The temperature is provided as input to microcontroller 40. A stack current sensor S2, for example a Hall sensor, measures the gross current through the fuel cell stack 12, and provides the value of the current as an input to microcontroller 40. A cooling fan controller CS3 controls the operation of one or more cooling fans 84 for cooling fuel cell stack 12. After passing through fuel cell stack 12, the warmed cooling air circulates around fuel tanks 52. The warmed cooling air then passes through evaporator 58. A power relay controller CS6 such as a solenoid connects, and disconnects, fuel cell stack 12 to, and from, an external electrical circuit in response to microcontroller 40. A power diode 59 provides one-way isolation of the fuel cell system 10 from the external load to provide protection to the fuel cell system 10 from the external load. A battery relay controller CS8 connects, and disconnects, fuel cell monitoring and control system 14 between the fuel cell stack 12 and the battery 47.

The fuel cell monitoring and control system 14 (illustrated in FIG. 4) includes sensors for monitoring fuel cell system 10 surroundings and actuators for controlling fuel cell system 10 accordingly. For example, a hydrogen concentration sensor S5 (shown in FIG. 3) for monitoring the hydrogen concentration level in the ambient atmosphere surrounding fuel cell stack 12. The hydrogen concentration sensor S5 can take the form of a heater element with a hydrogen sensitive thermister that may be temperature compensated. An oxygen concentration sensor S7 (illustrated in FIG. 4) to monitor the oxygen concentration level in the ambient atmosphere surrounding fuel cell system 10. An ambient temperature sensor S10 (shown in FIG. 3), for example a digital sensor, to monitor the ambient air temperature surrounding fuel cell system 10.

Figure 4:
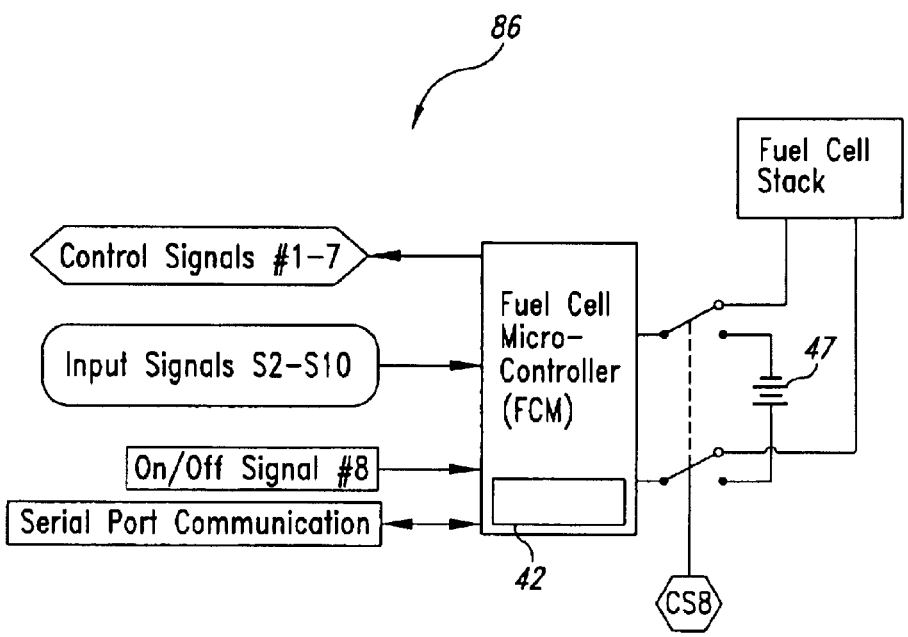
FIG. 4 is a schematic diagram of an additional portion of the fuel cell ambient environment monitoring and control system of FIG. 3, including a fuel cell microcontroller selectively coupled between the fuel cell stack and a battery.

With reference to FIG. 4, microcontroller 40 receives the various sensor measurements such as ambient air temperature, fuel pressure, hydrogen concentration, oxygen concentration, fuel cell stack current, air mass flow, cell voltage check status, voltage across the fuel cell stack, and voltage across the purge cell portion of the fuel cell stack from various sensors described below. Microcontroller 40 provides the control signals to the various actuators, such as air compressor controller CS1, cooling fan controller CS3, purge valve controller CS4, main gas valve solenoid CS5, power circuit relay controller CS6, hydride tank valve solenoid CS7, and battery relay controller CS8.

Fuel Cell System Structural Arrangement

FIGS. 5–8 illustrate the structural arrangement of the components in fuel cell system 10. For convenience, "top", "bottom", "above", "below" and similar descriptors are used merely as points of reference in the description, and while corresponding to the general orientation of the illustrated fuel cell system 10 during operation, are not to be construed to limit the orientation of the fuel cell system 10 during operation or otherwise.

Figure 5:
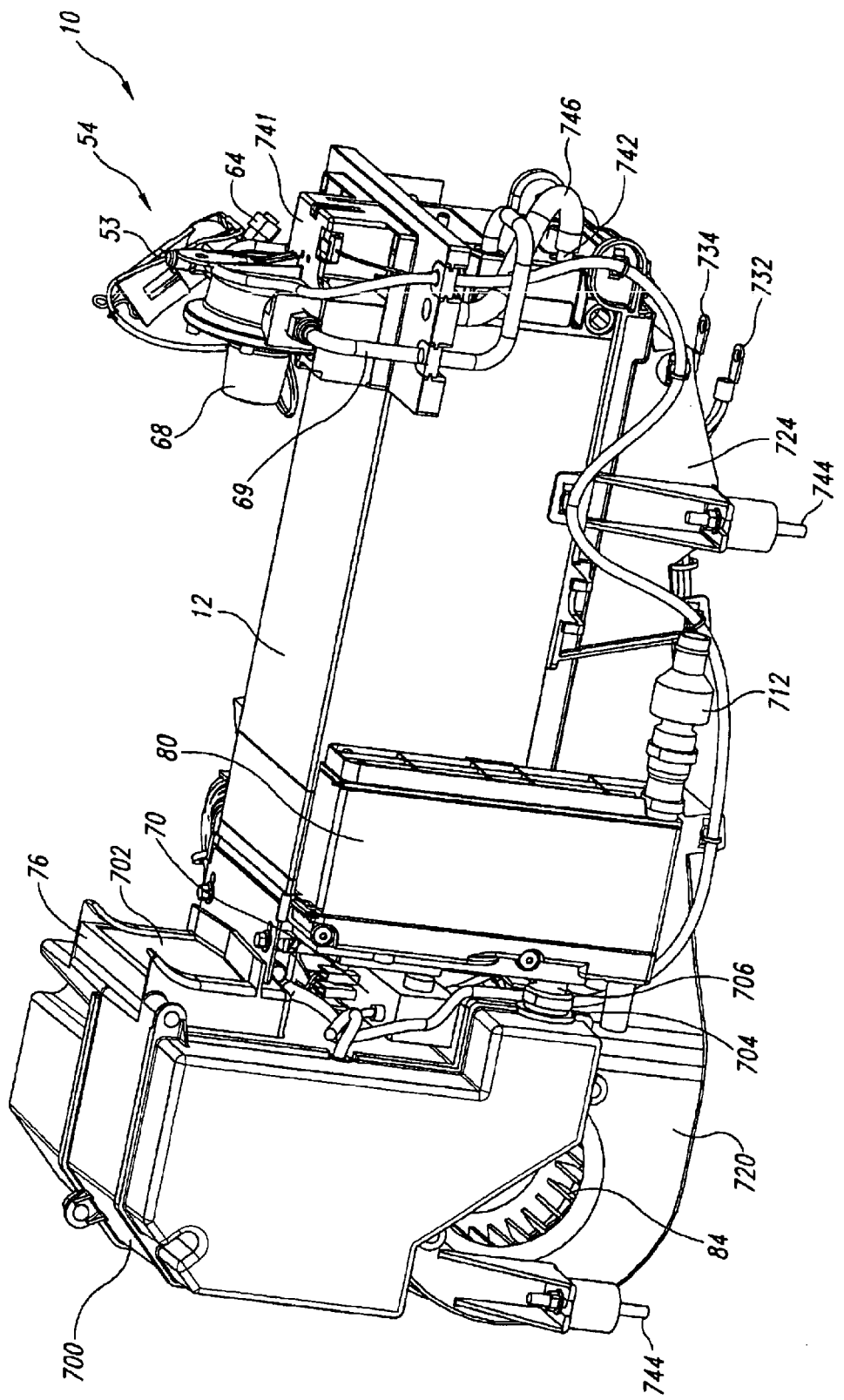
FIG. 5 is a top, right isometric view of a structural arrangement of various components of the fuel cell system of FIG. 1.
Figure 6:
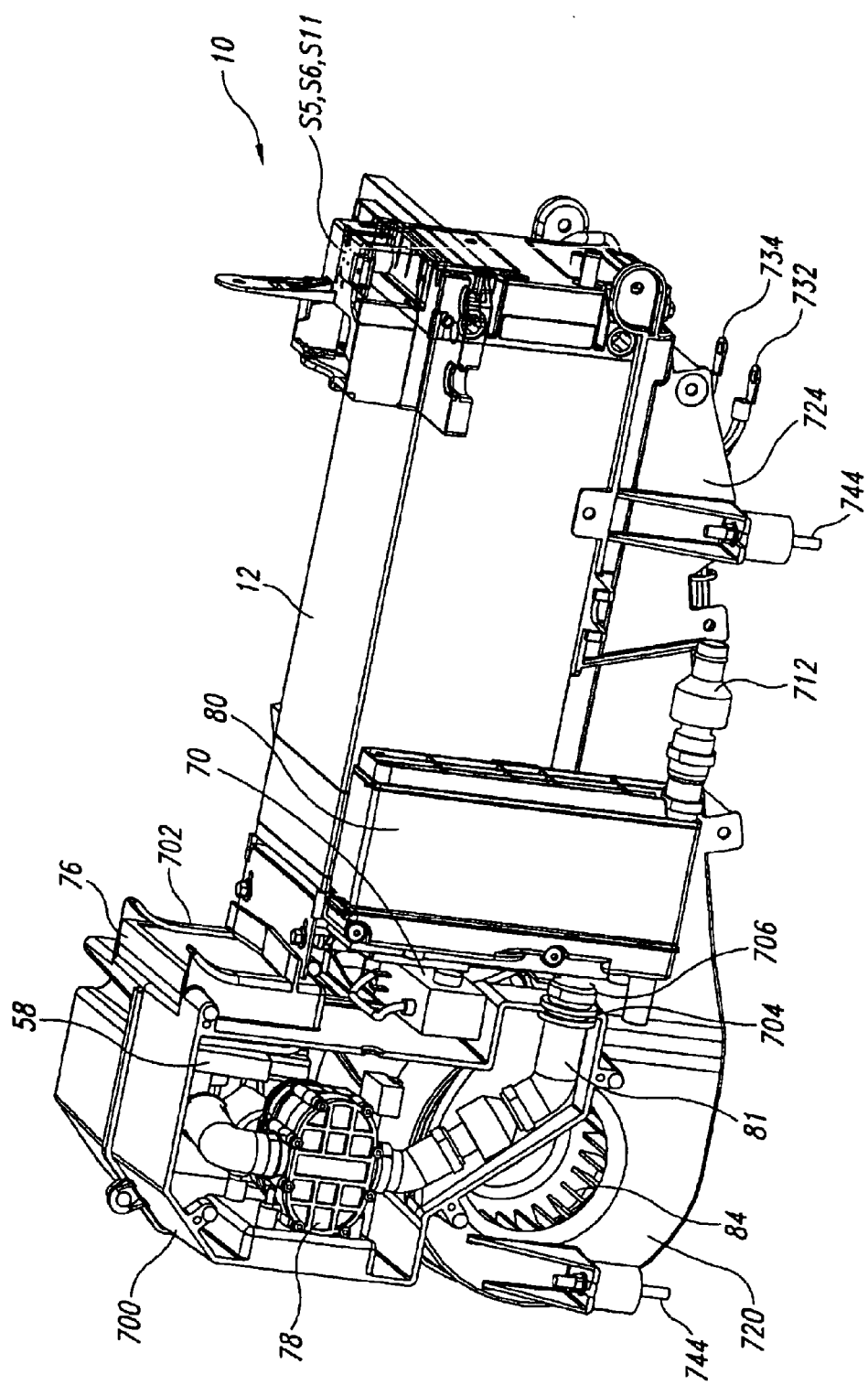
FIG. 6 is a top, right isometric view of the structural arrangement of various components of the fuel cell system of FIG. 5 with a cover removed.
Figure 7:
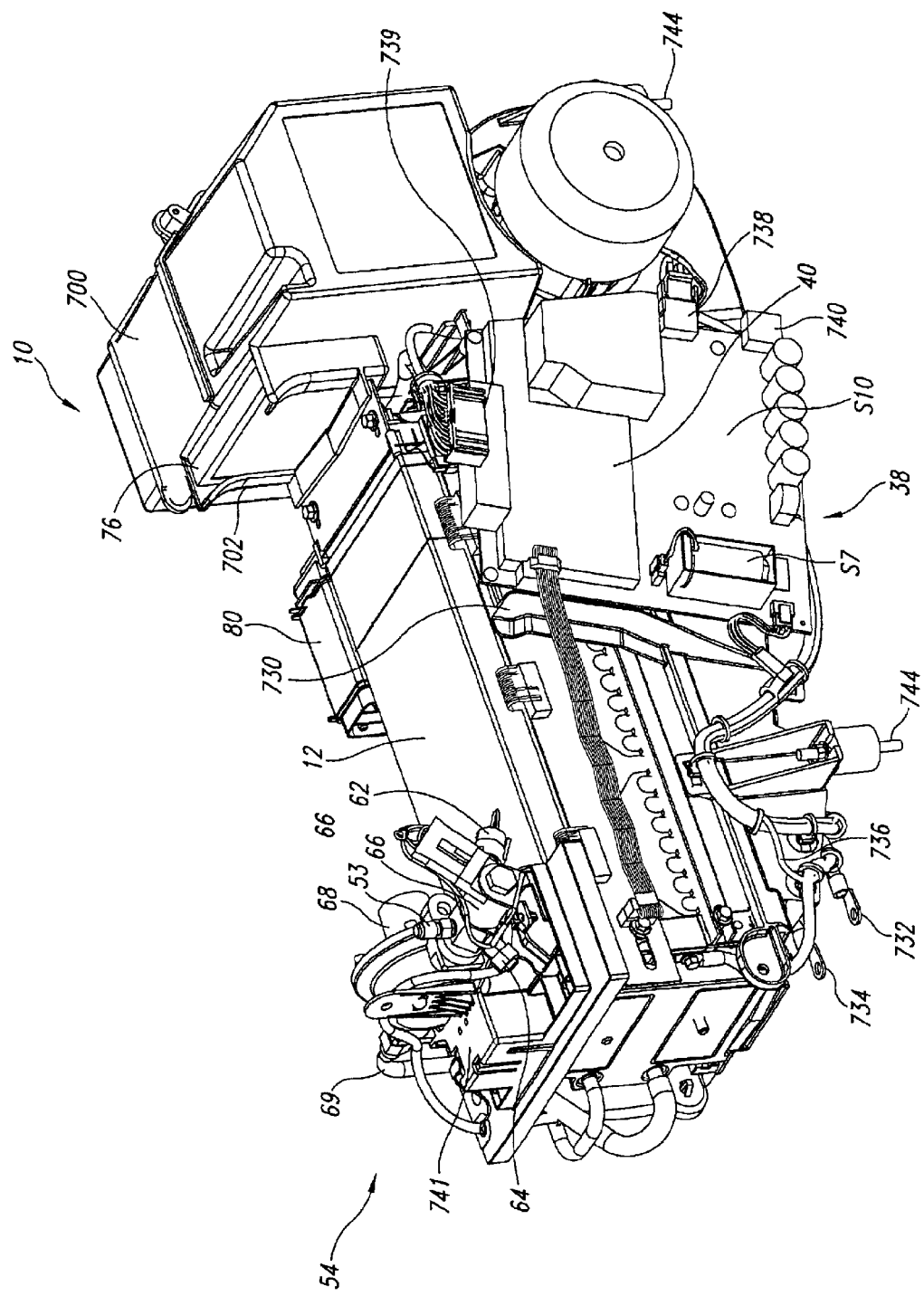
FIG. 7 is top, left isometric view of the structural arrangement of various components of the fuel cell system of FIG. 5.

Referring to FIGS. 5–7, the air compressor 78 and cooling fan 84 are grouped together at one end ("air supply end") of the fuel cell stack 12. Fuel tanks 52 (not shown in FIGS. 5–7) are mountable to the fuel cell system 10 on top of, and along the length of, the fuel cell stack 12. The components of fuel regulating system 54 upstream of the fuel cell stack 12 are located generally at the end of stack 12 ("hydrogen supply end") opposite the air supply end.

Air compressor 78 is housed within an insulated housing 700 that is removably attached to the fuel cell stack 12 at the air supply end. The housing 700 has an air supply aperture 702 covered by the filter 76 that allows supply air into housing 700. The air compressor 78 is a positive displacement low pressure type compressor and is operable to transmit supply air to air supply conduit 81 at a flow rate controllable by the operator. An air supply conduit 81 passes through a conduit aperture 704 in compressor housing 700 and connects with an air supply inlet 706 of humidity exchanger 80. Mass flow sensor S8 is located on an inlet of air compressor 78 and preferably within compressor housing 700.

The humidity exchanger 80 may be of the type disclosed in U.S. Pat. No. 6,106,964, and is mounted to one side of fuel cell stack 12 near the air supply end. Air entering into humidity exchanger 80 via air supply conduit 81 is humidified and then exhausted from the humidity exchanger 80 and into the fuel cell stack 12 (via the supply air inlet port of the end plate 18b). Exhaust air from the fuel cell stack 12 exits via the exhaust air outlet port in end plate 18b and is directed into humidity exchanger 80, where water in the air exhaust stream is transferred to the air supply stream. The air exhaust stream then leaves the humidity exchanger 80 via the air exhaust outlet 712 and is transmitted via an air exhaust conduit (not shown) to evaporator 58 (not shown in FIGS. 5–7) mountable to a cover (not shown) above fuel cell stack 12.

Cooling fan 84 is housed within a fan housing 720 that is removably mounted to the air supply end of fuel cell stack 12 and below compressor housing 700. Fan housing 720 includes a duct 724 that directs cooling air from cooling fan 84 to the cooling channel openings at the bottom of fuel cell stack 12. Cooling air is directed upwards and through fuel cell stack 12 (via the cooling channels 32) and is discharged from the cooling channel openings at the top of fuel cell stack 12. During operation, heat extracted from fuel cell stack 12 by the cooling air is used to warm fuel tanks 52 that are mountable directly above and along the length of stack 12. Some of the warmed cooling air can be redirected into the air supply aperture 702 of compressor housing 700 for use as oxidant supply air.

Referring particularly to FIG. 7, circuit board 38 carrying microcontroller 40, oxygen sensor S7 and ambient temperature sensor S10 is mounted on the side of fuel cell stack 12 opposite humidity exchanger 80 by way of a mounting bracket 730. Positive and negative electrical power supply lines 732, 734 extend from each end of fuel cell stack 12 and are connectable to an external load. An electrically conductive bleed wire 736 from each of power supply lines 732, 734 connects to circuit board 38 at a stack power-in terminal 738 and transmits some of the electricity generated by fuel cell stack 12 to power the components on the circuit board 38, as well as sensors 44 and actuators 46 which are electrically connected to circuit board 38 at terminal 739. Similarly, battery 47 (not shown in FIGS. 5–7) is electrically connected to circuit board 38 at battery power in terminal 740. Battery 47 supplies power to the circuit board components, sensors 44 and actuators 46 when fuel cell stack output has not yet reached nominal levels (e.g., at start-up); once fuel cell stack 12 has reached nominal operating conditions, fuel cell stack 12 can also supply power to recharge the battery 47.

Figure 8:
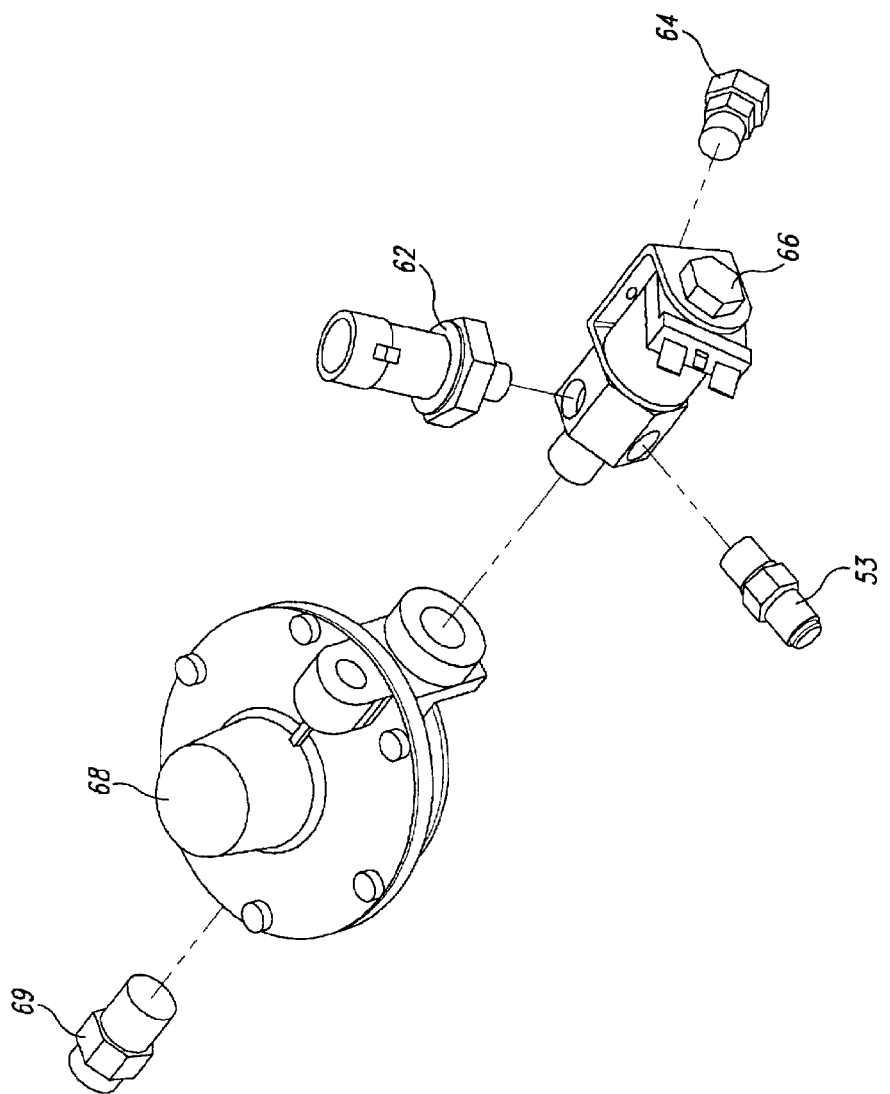
FIG. 8 is a top, right isometric view of a pressure regulator portion of the fuel cell system of FIG. 5.

Referring generally to FIGS. 5–7 and particularly to FIG. 8, a bracket 741 is provided at the hydrogen supply end for the mounting of a fuel tank valve connector 53, hydrogen pressure sensor 62, pressure relief valve 64, main gas valve 66, and hydrogen pressure regulator 68 above the fuel cell stack 12 at the hydrogen supply end. A suitable pressure regulator may be a Type 912 pressure regulator available from Fisher Controls of Marshalltown, Iowa. A suitable pressure sensor may be a transducer supplied Texas Instruments of Dallas, Tex. A suitable pressure relief valve may be supplied by Schraeder-Bridgeport of Buffalo Grove, Ill. A low pressure relief valve 742 is provided for the fuel cell stack 12. The bracket 741 also provides a mount for hydrogen concentration sensor S5, hydrogen heater current sensor S6 and hydrogen sensor check sensor S11, which are visible in FIG. 6 in which the bracket 741 is transparently illustrated in hidden line. The fuel tanks 52 are connectable to the fuel tank connector 53. When the fuel tank and main gas valves 56, 66 are opened, hydrogen is supplied under a controlled pressure (monitored by pressure sensor 62 and adjustable by hydrogen pressure regulator 68) through the fuel supply conduit 69 to the fuel inlet port of end plate 18a. The purge valve 70 is located at the fuel outlet port at end plate 18b.

The fuel cell system 10 and fuel tanks 52 are coupled to a base (not shown) at mounting points 744 and housed within a fuel cell system cover (not shown). Cooling air exhausted from the top of the fuel cell stack 12 is thus directed by the cover either to the supply air inlet 702 or over fuel regulating system 54 to a cooling air discharge opening in the housing.

The fuel cell system 10 is designed so that components that are designed to discharge hydrogen or that present a risk of leaking hydrogen, are as much as practical, located in the cooling air path or have their discharge/leakage directed to the cooling air path. The cooling air path is defined by duct 724, cooling air channels of stack 12, and the portion of the system cover above stack 12; a cooling air stream passing through the cooling air path is shown by the arrows in FIGS. 5, 6 and 7. The components directly in the cooling air path include fuel tanks 52, and components of fuel regulating system 54 such as pressure relief valve 64, main gas valve 66, and hydrogen regulator 68. Components not directly in the cooling air path are fluidly connected to the cooling air path, and include purge valve 70 connected to duct 724 via purge conduit (not shown) and low pressure relief valve 742 connected to an outlet near fuel regulating system 54 via conduit 746. When cooling air fan 84 is operational, the cooling air stream carries leaked/discharged hydrogen through duct 724, past stack 12, and out of system 10 in the direction of the arrows shown in FIGS. 5, 6, and 7. Hydrogen concentration sensor S5 is strategically placed as far downstream as possible in the cooling air stream to detect hydrogen carried in the cooling air stream.

Hydrogen concentration sensor S5 is also placed in the vicinity of the components of fuel regulating system 54 to improve detection of hydrogen leaks/discharges from fuel regulating system 54.

Exemplary Method of Operation

The fuel cell system 10 can employ a number of operating states that may determine which operations or tasks the microcontroller 40 executes, and may determine the response of the microcontroller 40 to various readings or measurements of the fuel cell system operating parameters. The microcontroller 40 executes software that can be programmed into and executed from an on-chip flash memory of the microcontroller 40 or in other controller-readable memory. In particular, the fuel cell system 10 can employ a standby state, starting state, running state, warning state, failure state, and stopping state.

In a standby state the fuel cell stack 12 is not operating and the microcontroller 40 monitors a startline for a startup signal. For example, operator activation of a start button or switch (not shown) can generate the startup signal on the startup line.

In a starting state, the microcontroller 40 initializes itself, places all actuators and control devices in their proper initial states, enables a serial interface, starts a watchdog timer, and performs a series of checks to ensure that all systems and components are operational. If the outcomes of the checks are satisfactory, the microcontroller 40 causes the external load to be connected and enters a running state, otherwise the fuel cell system 10 enters a failure state without becoming operational.

In a running state, fuel and oxidant are supplied to the fully operational fuel cell stack 12. Microcontroller 40 monitors the performance of fuel cell system 10 based on the measured operating parameters, and controls the various systems via the various actuators discussed above. If microcontroller 40 determines that one or more operating parameters are outside of a warning range, microcontroller 40 places fuel cell system 10 into the warning state. If microcontroller 40 determines that one or more operating parameters are outside of a failure range, microcontroller 40 places the fuel cell system into the failure state. Otherwise, fuel cell system 10 continues in a running state until a stop signal is received on the startup line. In response to the stop signal, microcontroller 40 advances fuel cell system 10 from a running state to a stopping state if fuel cell system 10 has been in a running state for at least one minute. If so, the microcontroller 40 begins an extended shutdown procedure lasting approximately 45 seconds, during which time the fuel cell system 12 is in a stopping state. If not, microcontroller 40 engages the normal shutdown procedure and fuel cell system 10 proceeds directly from a running state to a standby state.

In a warning state, the microcontroller 40 can provide a warning notification of the out-of-warning range condition to the operator, but otherwise the fuel cell system 10 continues to operate. Additionally, the microcontroller 40 can write a warning condition code corresponding to the out-of-warning range condition to the persistent memory 42.

In a failure state, the microcontroller 40 immediately stops operation of the fuel cell system 10 and writes a fault condition code to the persistent memory 42. The fuel cell system 10 remains in a failure state until a stop signal is received on the startline. In response to the stop signal, the microcontroller 40 completes the shut down of the fuel cell system 10 and places the fuel cell system 10 into a standby state.

In a stopping state, the microcontroller 40 shuts down the various components of the fuel cell system 10, stopping operation of the fuel cell system 10. Once the various components have been shut down, the microcontroller 40 places the fuel cell system 10 into a standby state.

Scheduling of Operations

FIG. 9 shows an exemplary set of operations or tasks 100 for execution by the microcontroller 40, and sample frequencies, in microseconds, for the execution of each operation. The frequencies are empirically derived and provide a particularly efficient control regime for the fuel cell system 10 that ensures that each operating parameter is monitored or sampled at a suitable rate.

FIG. 10 shows an exemplary schedule 102 of the operations that corresponds to the frequencies set out in FIG. 9. The schedule 102 is particularly suited for operating the fuel cell system 10 in an enclosed space, particularly where the enclosed space is a habitable environment. Each second of system time is divided into twenty 50 microsecond intervals or "slots" represented by rows 104, each slot being enumerated in column 106. The microcontroller 40 can execute up to four operations or tasks 108, 110, 112, 114 during each slot. The nature, number, and order of these tasks is interval-specific, but each task is performed at least once every second. The control program is executed as a fixed sequence of 1 to 4 such function calls in each 50-microsecond interval. As discussed above, the behavior of most tasks depends on the current system state.

Figure 11:
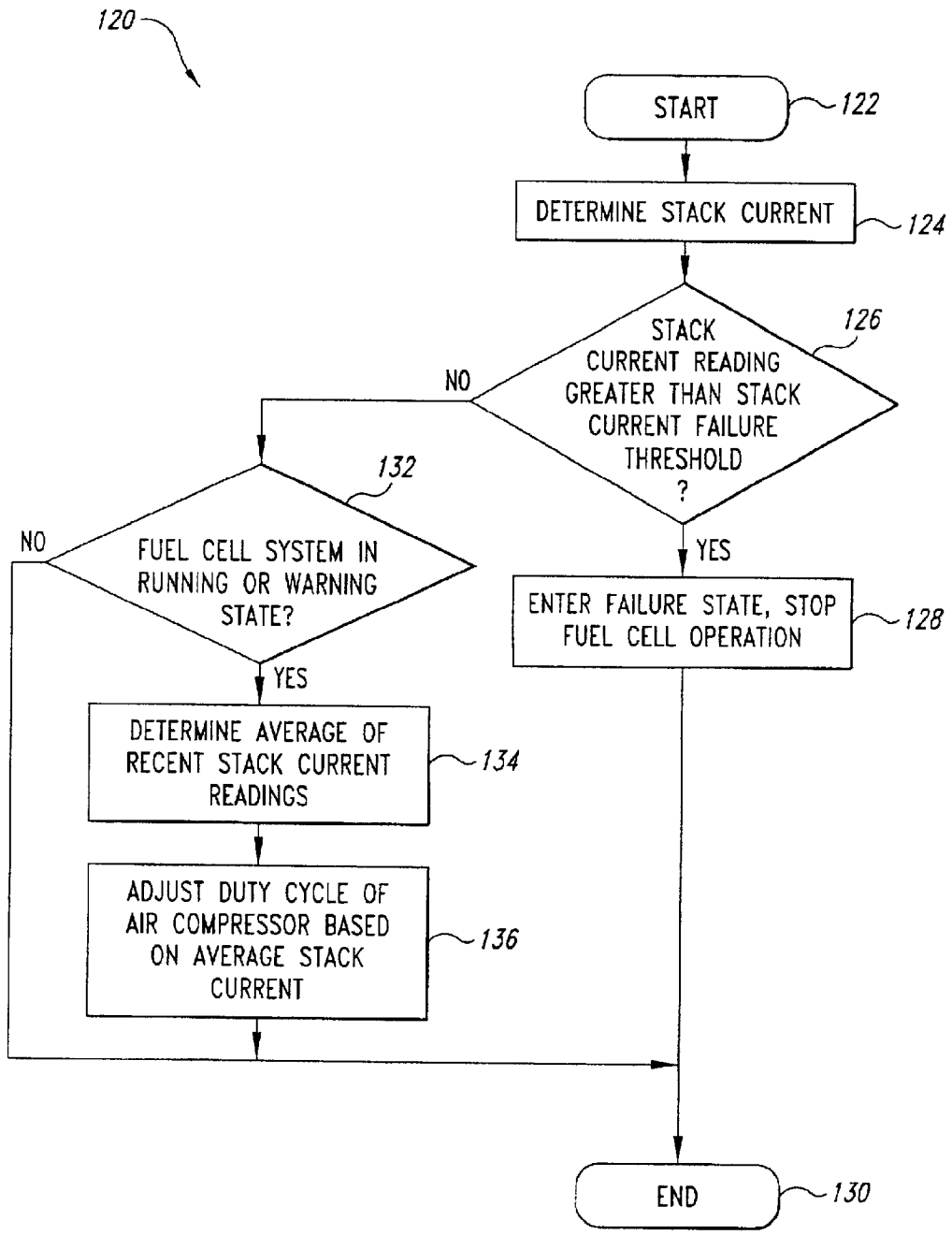
FIG. 11 is a flow diagram showing an exemplary method of monitoring the stack current in the fuel cell system of FIGS. 1 and 2, stopping fuel cell system operation if the stack current exceeds a stack current failure threshold and adjusting cooling of the fuel cell stack if the stack current does not exceed the stack current failure threshold.

FIG. 11 shows an exemplary method 120 of monitoring the stack current in the fuel cell system 10, stopping fuel cell system operation if the stack current exceeds a stack current failure threshold, and adjusting cooling of the fuel cell stack 12 if the stack current does not exceed a stack current failure threshold, starting in step 122. In step 124, the microcontroller 40 determines the stack current. For example, the microcontroller 40 may receive a stack current reading from the stack current sensor S2. The stack current is read or sampled by the microcontroller 40 every 50 microseconds so that the air compressor 78 which supplies oxygen to the fuel cell stack 12 can react quickly to the changing demands of the external load.

In step 126, the microcontroller 40 determines if the stack current reading is greater than the defined stack current failure threshold. The stack current failure threshold will depend on a variety of factors, but a suitable stack current failure threshold for the described embodiment may, for example, be approximately 70 amps. If the stack current reading is greater than the stack current failure threshold, the microcontroller 40 enters a failure state in step 128, immediately stopping operation of the fuel cell stack 12 and writing a respective fault condition code to the persistent memory 42. The microcontroller 40 does not set a non-restartable status flag in the persistent memory 42 since this fault is a restartable failure. The microcontroller 40 then terminates the stack current monitoring method 120 in step 130, until the method 120 is executed again, in the normal sequence of events.

If the stack current reading is not greater than the stack current failure threshold, the microcontroller 40 determines whether the fuel cell system 10 is in either the running or warning states in step 132. If the fuel cell system 10 is in either the running or warning state, the microcontroller 40 determines the average of the recent stack current readings in step 134. The microcontroller 40 adjusts the duty cycle of the air compressor 78 based on the average stack current in step 136. Employing an average of the recent stack current readings compensates for the inherent jitter in the stack current sensor S2, thus preventing unnecessary fluctuations in motor speed of the air compressor 78. For example, the microcontroller 40 can integrate the new current reading into an unweighted average of the ten most recent stack current readings. The stack current monitoring method 120 terminates in step 130, until the method 120 is executed again, in the normal sequence of events.

Additionally, the microcontroller 40 can employ an integration of the stack current over time to calculate the cumulative amount of fuel consumed. For example, the microcontroller 40 can increment the fuel consumption every 50 microseconds according to a linear function of the value of the stack current read in the particular time slot. The computation can be performed whenever the fuel cell system 10 is in starting, running, or warning states, i.e., whenever the fuel valves 56, 66 are open.

Figure 12:
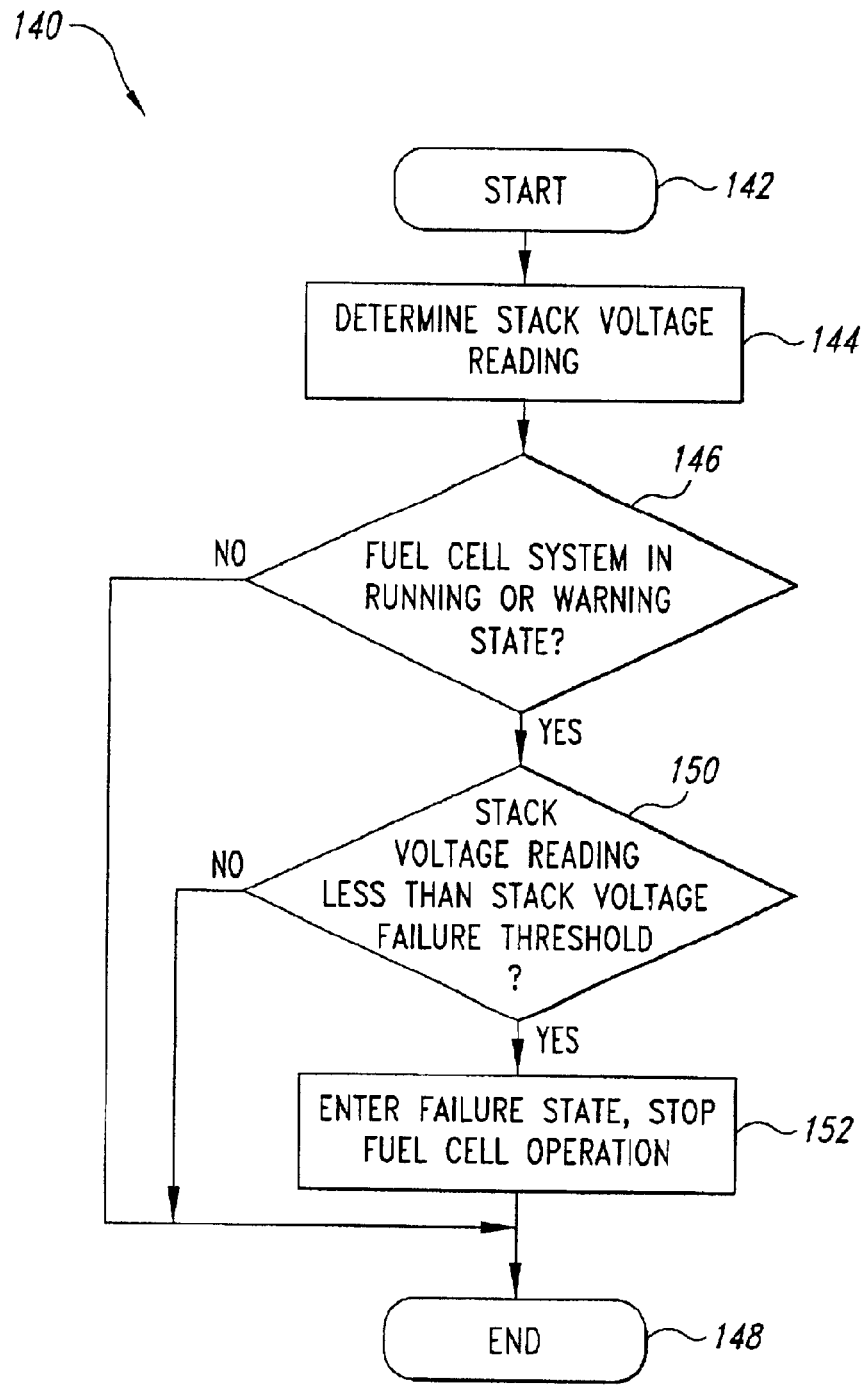
FIG. 12 is a flow diagram of an exemplary method of monitoring the stack voltage of the fuel cell system of FIGS. 1 and 2, and stopping fuel cell system operation if the stack voltage is less than a stack voltage failure threshold.

FIG. 12 shows an exemplary method 140 of monitoring stack voltage in the fuel cell system 10 and stopping fuel cell system operation if the stack voltage is less than a stack voltage failure threshold, starting in step 142. The microcontroller 40 may sample or read the stack voltage every 100 microseconds. In step 144, the microcontroller 40 determines a voltage across the fuel cell stack 12. For example, the microcontroller 40 may receive a stack voltage reading from the stack voltage sensor S3.

In step 146, the microcontroller 40 determines if the fuel cell system is in either a running or warning state. If the fuel cell system is not in a running or warning state, the stack voltage monitoring method 140 terminates in step 148, until the method 148 is executed again, in the normal sequence of events. If the fuel cell system is in either a running or warning state, the microcontroller 40 determines whether the stack voltage reading is less than a stack voltage failure threshold in step 150. The stack voltage failure threshold will depend on a variety of factors including the number of fuel cells in the fuel cell stack 12. A suitable stack voltage failure threshold for the described embodiment is approximately 18 volts. If the stack voltage reading is less than the stack voltage failure threshold, the microcontroller 40 enters a failure state in step 152, immediately stopping fuel cell operation and writing a respective fault condition code to the persistent memory 42. The microcontroller 40 does not set the non-restartable status flag in the persistent memory 42 since this fault is a restartable failure. The microcontroller 40 then terminates the stack voltage monitoring method 140 in step 148, until the method 140 is executed again, in the normal sequence of events.

Figure 13A:
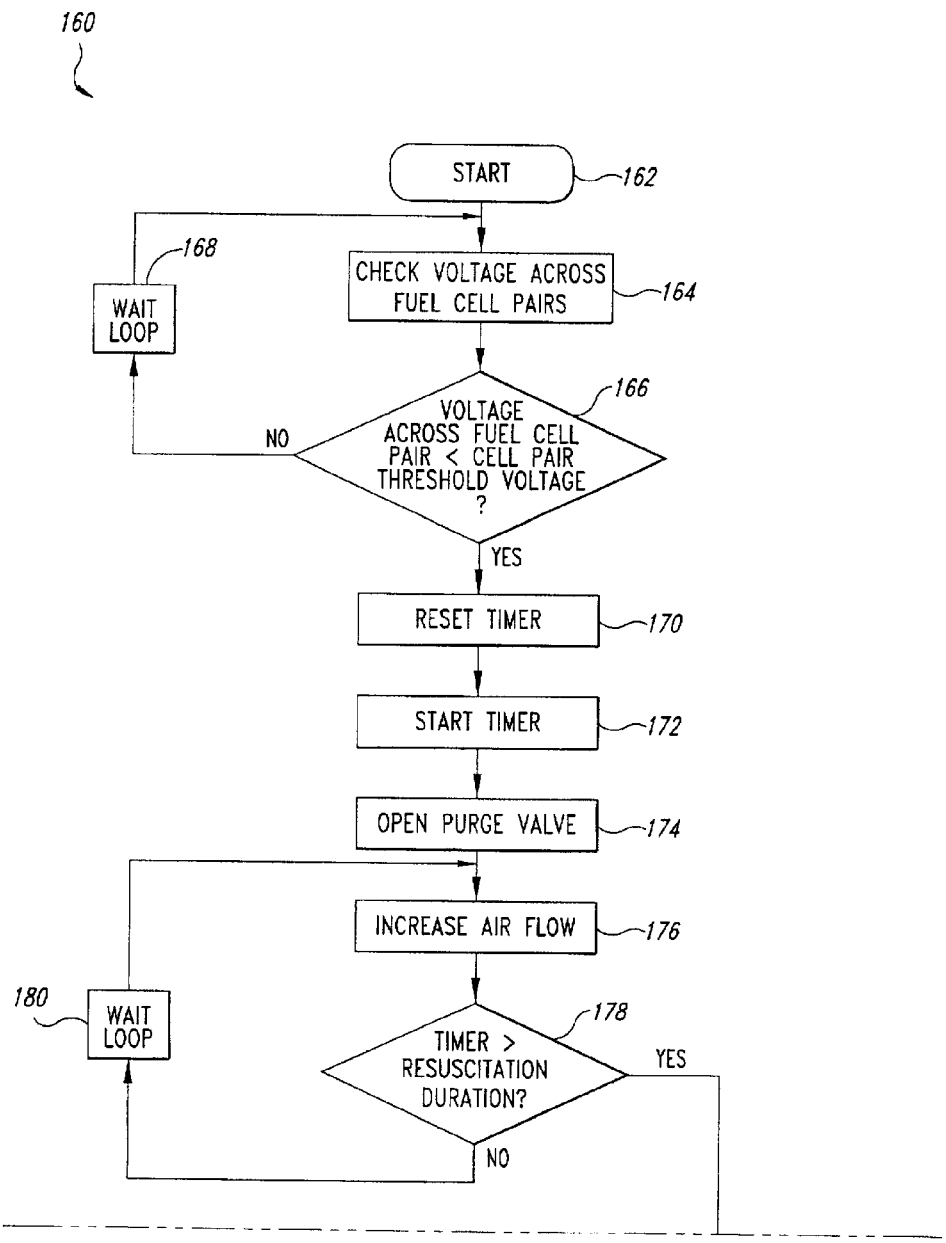
FIGS. 13A and 13B are a flow diagram showing an exemplary method of monitoring a voltage across fuel cells and resuscitating the fuel cell stack of FIGS. 1 and 2 in response to a low voltage situation.
Figure 13B:
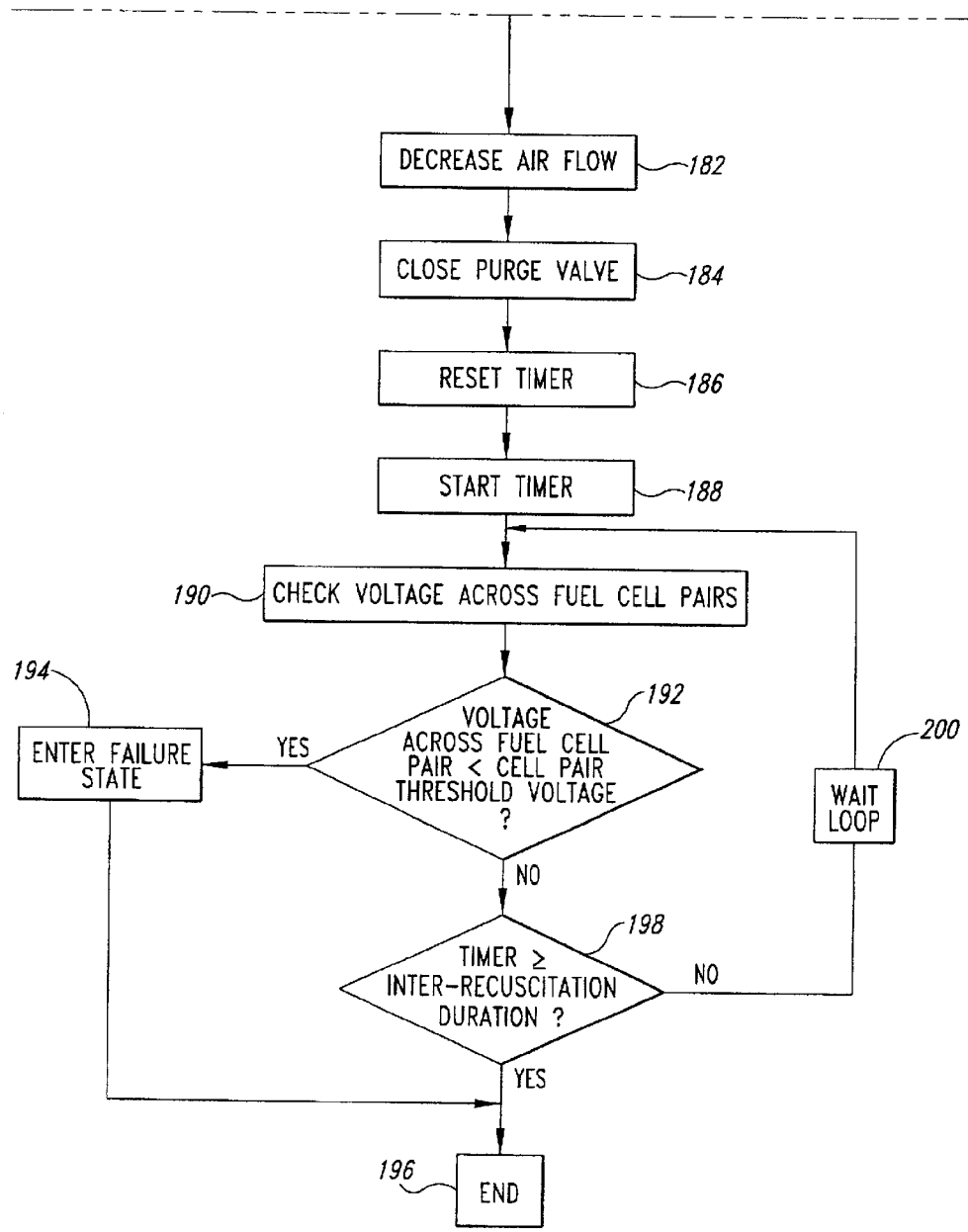

FIGS. 13A and 13B show an exemplary method 160 of monitoring the voltage across pairs of the fuel cell assemblies 16 in the fuel cell stack 12 and resuscitating the fuel cell stack 12 in response to a low voltage situation, starting in step 162. In step 164, the microcontroller 40 checks the voltage across pairs of fuel cells 20. The microcontroller 40 may sample or read the voltage across the fuel cell pairs every 200 microseconds. The microcontroller 40 can rely on a digital output of the cell voltage checker S9, such as the cell voltage checker described in commonly assigned U.S. patent application Ser. No. 09/916,115, filed on the same date herewith, entitled "FUEL CELL ANOMALY DETECTION METHOD AND APPARATUS." For example, if the output of the cell voltage checker 59 is "0" or LOW, the microcontroller 40 determines that the voltage across at least one pair of the fuel cell assemblies 16 is below the cell pair threshold voltage. A suitable cell pair threshold voltage for the described embodiment may be between approximately 0.8 V and 0.85 V, where each fuel cell assembly 16 produces approximately 0.6 V across the anode 22 and cathode 24. In step 166, the microcontroller 40 performs a first wait loop 168 if the voltage across a pair of fuel cell assemblies 16 is not less than the cell pair threshold voltage. The microcontroller 40 passes control to step 170 if the voltage across any pair of the fuel cell assemblies 16 is less than the cell pair threshold voltage.

In step 170, the microcontroller 40 resets a timer, preparing to open resuscitate the fuel cell stack 12 for a resuscitation duration. The fuel cell monitoring and control system 14 can employ one or more timers, which may be integral to the microcontroller 40 or can be discrete components. In step 172, the microcontroller 40 starts the timer. In step 174, the microcontroller 40 sends an appropriate signal to the purge valve controller CS4 to open the purge valve 70, which is normally closed during fuel cell system operation. In step 76, the microcontroller 40 provides signals to the air compressor controller CS1 to increase the duty cycle of the air compressor 78, thereby increasing airflow through the fuel cell stack 12. A suitable increase in duty cycle for the described embodiment may be approximately 50% over a standard operating duty cycle.

In step 178, the microcontroller 40 determines if the timer is at least equal to or greater than the resuscitation duration. A suitable resuscitation duration may be approximately 5–10 seconds for a 50% increase in duty cycle. The microcontroller 40 performs a second wait loop 180 if the timer is not greater than or equal to the resuscitation duration. The microcontroller 40 passes control to step 182 if the timer is greater than or equal to the resuscitation duration.

In step 182, the microcontroller 40 sends an appropriate signal to the air compressor controller CS1 to lower the duty cycle of the air compressor 78, thereby decreasing airflow through the fuel cell stack 12. In step 184, the microcontroller 40 sends an appropriate signal to the purge valve controller CS4 to close the purge valve 70, ending the resuscitation.

In step 186, the microcontroller 40 resets a timer in preparation for an inter-resuscitation period. The inter-resuscitation period immediately follows the resuscitation and prevents successive attempts at resuscitation within a determined length of time (i.e., the inter-resuscitation period). A suitable inter-resuscitation duration for the described embodiment may be approximately 20 seconds. In step 188, the microcontroller 40 starts the timer for the inter-resuscitation period.

In step 190, the microcontroller 40 checks the voltage across the pairs of fuel cell assemblies 16, in a similar fashion to that of step 164. In step 192, the microcontroller 40 passes control to step 194, entering a failure state, stopping operation of the fuel cell system 10 and writing a respective fault condition code to the persistent memory 42, if the voltage across any pair of the fuel cell assemblies 16 is less than the cell pair threshold voltage during the inter-resuscitation period. The microcontroller 40 does not set the non-restartable status flag in the persistent memory 42 since this fault is a restartable failure. The microcontroller 40 then terminates the fuel cell voltage monitoring method 160 in step 196, until the method 160 is executed again, in the normal sequence of events. If in step 192, the voltage across any pair of the fuel cell assemblies 16 is not less than the cell pair threshold voltage, the microcontroller 40 passes control to step 198.

In step 198, the microcontroller 40 determines if the timer is equal to or greater than the inter-resuscitation duration. If the timer is equal to or greater than the inter-resuscitation duration, the microcontroller 40 passes control to step 196 to terminate the fuel cell voltage monitoring method 160, until the method 160 is executed again, in the normal sequence of events. The microcontroller 40 performs a third wait loop 200 if the timer is not greater than or equal to the inter-resuscitation duration.

Figure 14:
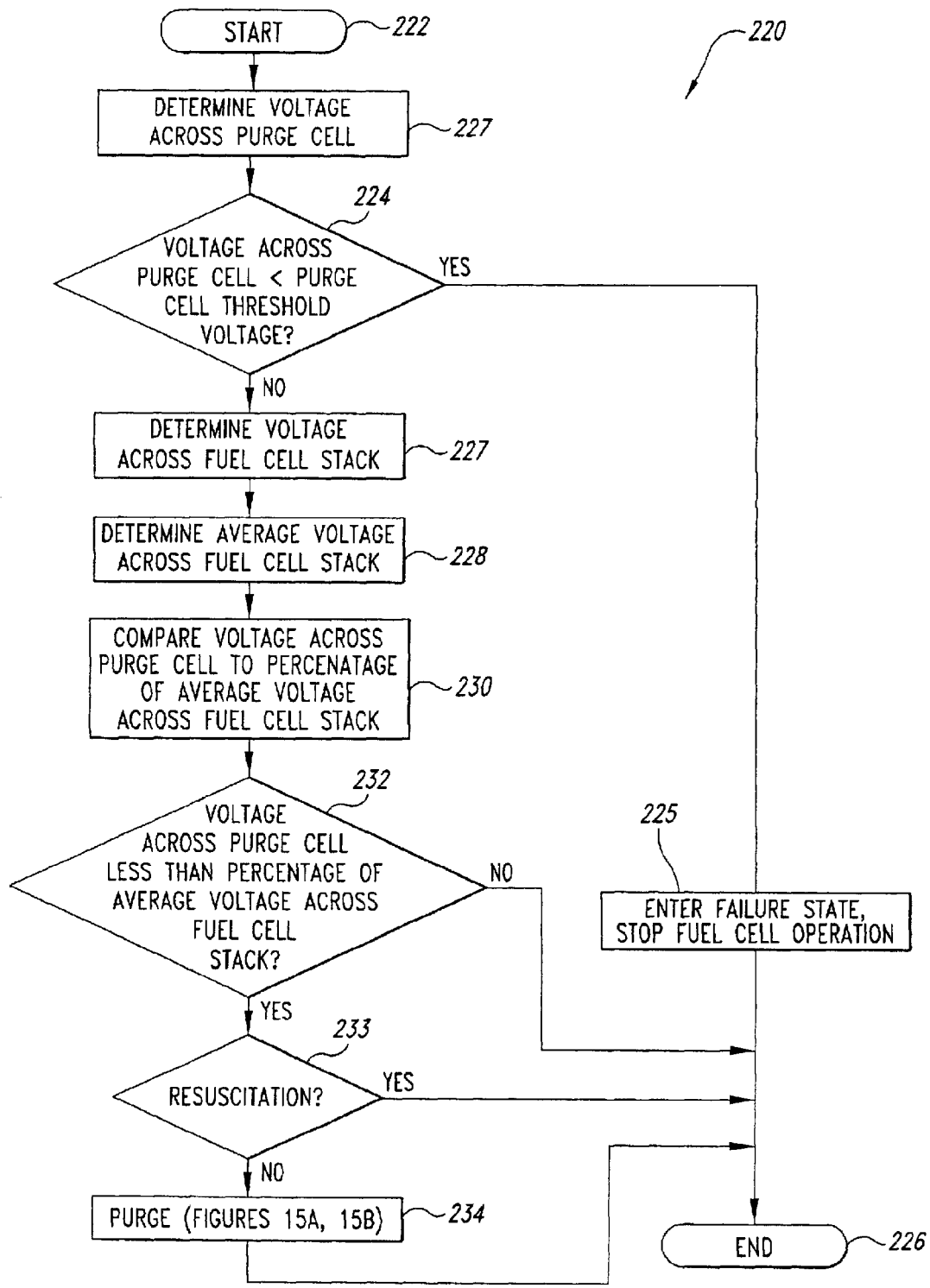
FIG. 14 is a flow diagram showing an exemplary method of monitoring voltage across a purge cell of the fuel cell stack of FIGS. 1 and 2, stopping fuel cell system operation if the voltage across the purge cell is less than a purge cell voltage failure threshold, and otherwise determining when to purge the fuel cell stack.

FIG. 14 shows an exemplary method 220 of monitoring voltage across the purge cell 36 of the fuel cell stack 12, stopping fuel cell system operation if the voltage across the purge cell portion 36 of the fuel cell stack 12 is less than a purge cell voltage failure threshold, and determining when to purge the fuel cell stack 12 if the voltage across the purge cell portion 36 is not less than a purge cell voltage failure threshold, starting in step 222. In step 223, the microcontroller 40 determines the voltage across the purge cell 36, i.e., the final fuel cell assemblies 16 in the fuel cell stack 12 with respect to a flow of fuel through the fuel cell stack 12. The microcontroller 40 may sample or read the voltage across the purge cell portion every 100 microseconds. The microcontroller 40 may determine the purge cell voltage by receiving a purge cell voltage measurement from the purge cell voltage sensor S4. The microcontroller 40 may employ an average of the total purge cell voltage where the purge cell portion 36 contains more than one fuel cell assembly 16, for example dividing the voltage across the purge cell portion 36 by the number of fuel cell assemblies 16 comprising the purge cell portion 36.

In step 224, the microcontroller 40 determines whether the voltage measured across the purge cell 36 is less than a purge cell voltage failure threshold. A suitable purge cell voltage failure threshold for the described embodiment is approximately 0.8V. If the voltage measured across the purge cell portion 36 is less than a purge cell voltage failure threshold, the microcontroller 40 enters a fault state in step 225, stopping operation of the fuel cell system 10 and to writing a respective fault condition code to the persistent memory 42. The microcontroller 40 does not set the non-restartable status flag in the persistent memory 42 since this fault is a restartable failure. The microcontroller 40 terminates the fuel cell voltage monitoring method 220 in step 226, until the method 220 is executed again, in the normal sequence of events. If the voltage measured across the purge cell 36 is not less than a purge cell voltage failure threshold, the microcontroller 40 passes control to step 227.

In step 227, the microcontroller 40 determines the voltage across the fuel cell stack 10. For example, the microcontroller 40 may receive a measurement of the voltage across the fuel cell stack 10 from the stack voltage sensor S3. Alternatively, the microcontroller 40 may rely on the voltage across a lesser number of fuel cell assemblies 16, such as the voltage across a fuel cell structure or a set of fuel cell assemblies 16.

In step 228, the microcontroller 40 determines an average voltage across the fuel cell stack 10. The microcontroller 40 may divide the voltage across the entire fuel cell stack 10, as determined in the step 227, by the number of fuel cell assemblies 16 in the fuel cell stack 12 to determine the average voltage across a fuel cell assembly 16.

In step 230, the microcontroller 40 compares the voltage across the purge cell 36 to a defined percentage of the average voltage that was determined in step 228. A suitable percentage for the described embodiment may be approximately 90%. In step 232, if the voltage across the purge cell 36 is not less than the percentage of the average voltage across the fuel cell stack 12, the microcontroller 40 terminates the fuel cell voltage monitoring method 220 in step 226. In step 232, if the voltage across the purge cell 36 is less than the percentage of the determined average voltage, the microcontroller 40 passes control to step 233.

In step 233, the microcontroller 40 determines whether the fuel cell stack 12 is being resuscitated. If the fuel cell stack 12 is being resuscitated, the microcontroller 40 in step 232 terminates the fuel cell voltage monitoring method 220 in step 226. If the microcontroller 40 determines that the fuel cell stack 12 is not being resuscitated, control passes to step 234 for purging the fuel cell stack 12.

Figure 15A:
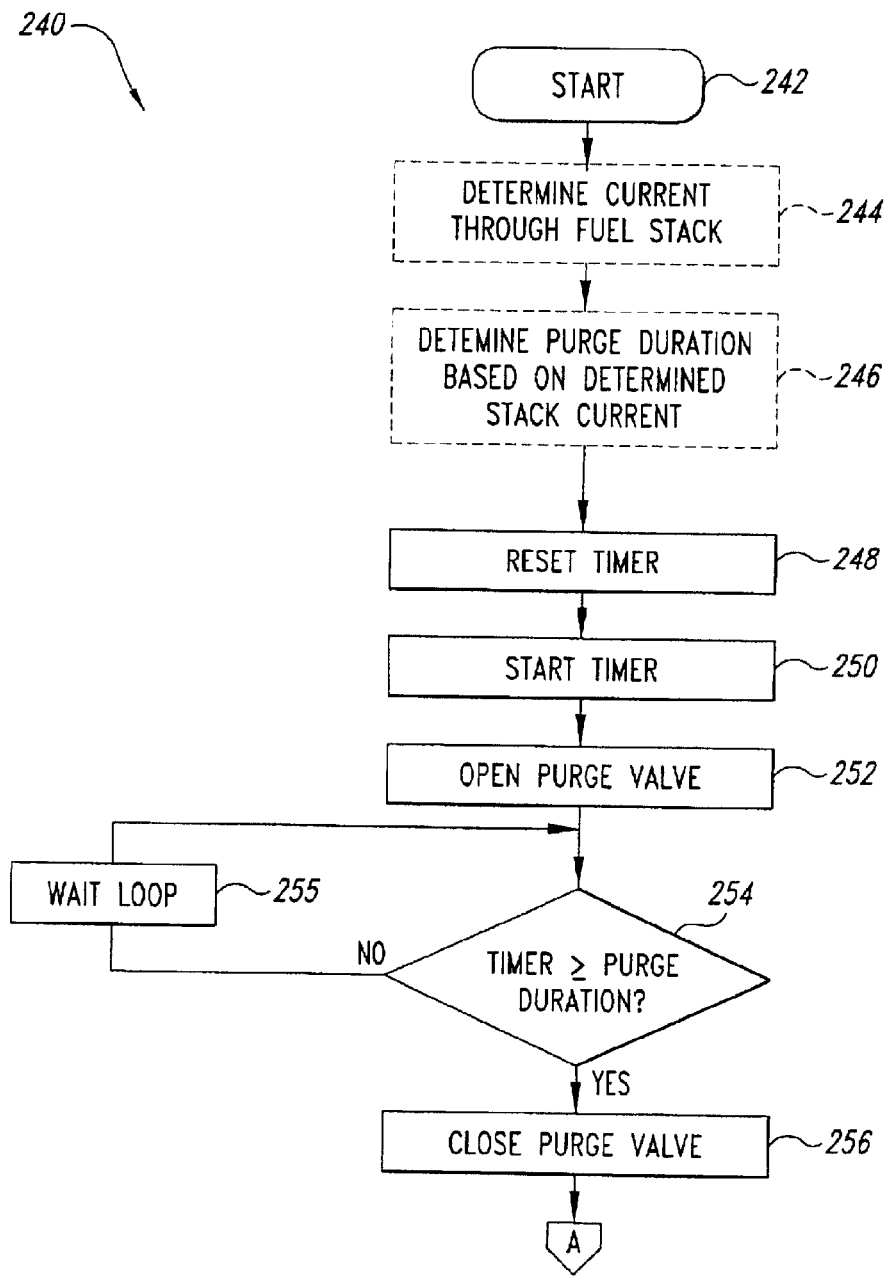
FIGS. 15A and 15B are a flow diagram of an exemplary method of purging the fuel cell stack for a purge duration.
Figure 15B:
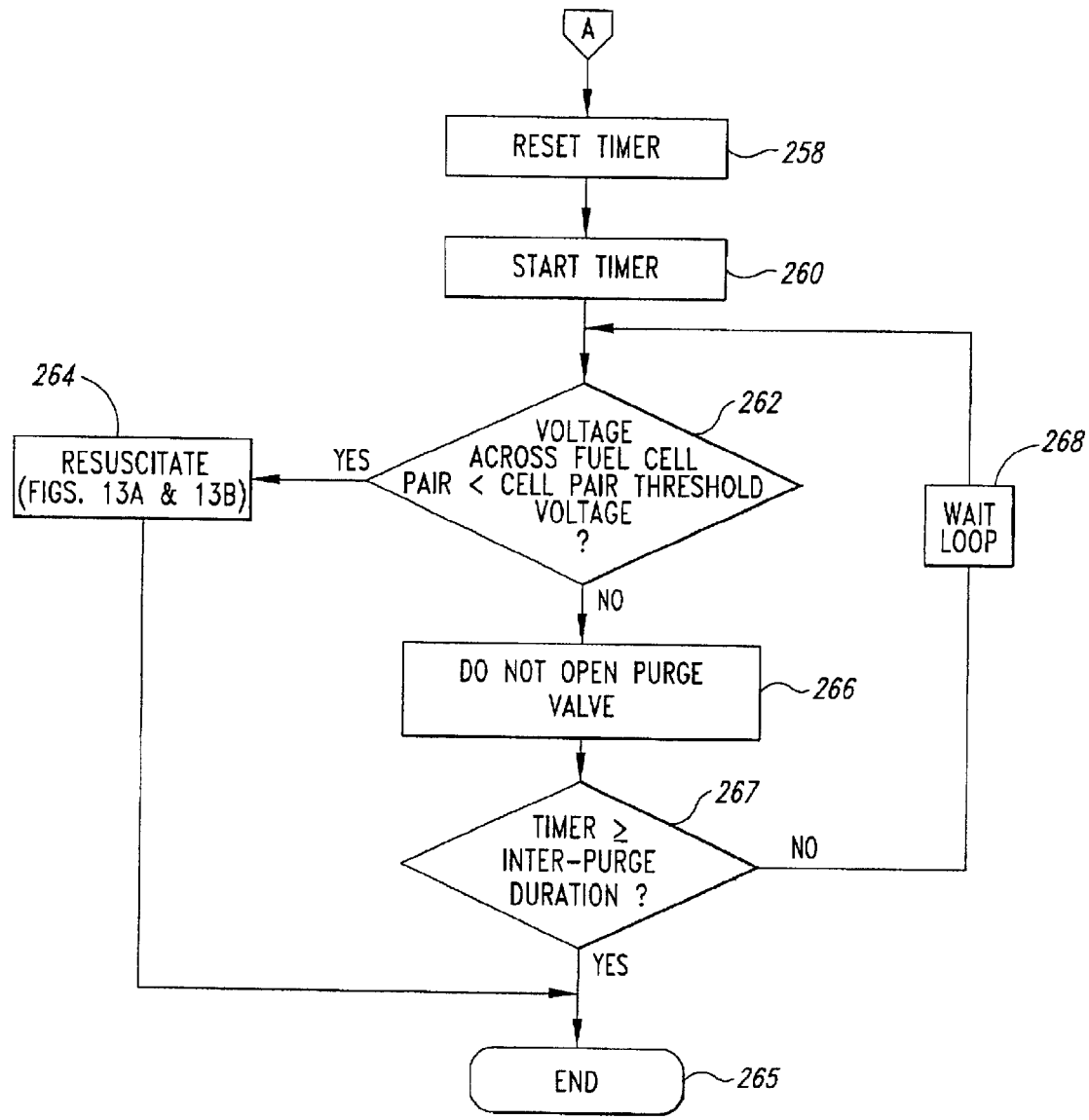

FIGS. 15A and 15B show an exemplary method 240 of purging the fuel cell stack 12, starting in step 242. In optional step 244, the microcontroller 40 determines the stack current through the fuel cell stack 12. The microcontroller 40 can receive the stack current measurement from the fuel cell stack current sensor S2. In optional step 246, the microcontroller 40 can determine the purge duration based on the determined stack current. The microcontroller 40 can rely on a lookup table stored in the persistent memory 42, or can calculate the purge duration based on the stack current using an empirical formula. An empirically derived relationship employs two purges, each of a purge duration $T_1$ with a 0.5 second period between the first and second purges. Additionally, the empirically derived relationship employs an inter-purge duration $T_2$ following the second purge, before another purge sequence is permitted. $T_1$ and $T_2$ are linear functions of the average stack current between 0 amps and 55 amps. At an average stack current of 0 amps, $T_1$ is equal to approximately 0.5 seconds and $T_2$ is equal to approximately 6.0 seconds. At an average stack current of 55 amps and greater, $T_1$ is equal to approximately 1.5 seconds and $T_2$ is equal to approximately 2.5 seconds.

Alternatively, the microcontroller 40 can employ a predefined purge duration, or can employ the longer of the predefined purge duration and the purge duration determined based on the stack current measurement. A suitable predefined purge duration for the described embodiment is approximately 3 seconds.

The fuel cell system 10 can also employ different predefined purge durations during various operational states to more precisely match the purging to the fuel cell system's 10 requirements. For example, the fuel cell system 10 can employ a startup purge duration while operating in a starting state, and a shutdown purge duration while operating in a stopping state. In addition, the fuel cell system 10 can calculate the purge duration based on the stack current or employ a different predefined purge duration during running and/or warning states.

In step 248, the microcontroller 40 resets a timer, subsequently starting the timer in step 250. In step 252, the microcontroller 40 sends a signal to the purge valve controller CS4 to open the purge valve 70, which is typically closed in normal fuel cell system operation.

In step 254, the microcontroller 40 performs a wait loop 255 if the timer is not equal to or greater than the purge duration. In step 254, the microcontroller 40 passes control to step 256 if the timer equals or greater than the purge duration. In step 256, the microcontroller 40 sends a signal to the purge valve controller C54 to close the purge valve 70, completing the purging of the fuel cell stack 12. While FIG. 15 represents the purging as a single opening of the purge valve 70, the fuel cell system 10 can employ "pulsed" purging, where the purge valve is opened two or more times in succession, with brief periods in between the successive openings. Such an operation is set out in detail in commonly assigned U.S. patent application Ser. No. 09/916,211, entitled "FUEL CELL PURGING METHOD AND APPARATUS."

In step 258, the microcontroller 40 resets the timer in preparation for entering an inter-purge period. The inter-purge period is a period immediately following the purge, and during which the microcontroller 40 will not open the purge valve, except in response to a resuscitation condition (i.e., voltage across purge cell less than percentage of average voltage across fuel cell assembly). A suitable inter-purge duration for the described embodiment is approximately 10 seconds. The microcontroller 40 starts the timer in step 260.

In step 262, if the voltage across purge cell portion 36 is less than percentage of average voltage across fuel cell assembly (i.e., resuscitation condition), the microcontroller 40 passes control to step 264 to resuscitate the fuel cell stack 12, and terminates the purge method 240 in step 265. Otherwise, the microcontroller 40 passes control to step 266 to prevent the purge valve 70 from opening. In step 267, the microcontroller 40 determines if the timer is greater than or equal to the inter-purge duration. If the timer is less the inter-purge duration, the microcontroller 40 executes a second wait loop 268, preventing the purge valve 70 from opening until the inter-purge duration is complete, except for resuscitation The purge method 240 terminates in step 265, until the method 270 is executed again, in the normal sequence of operations.

Figure 16:
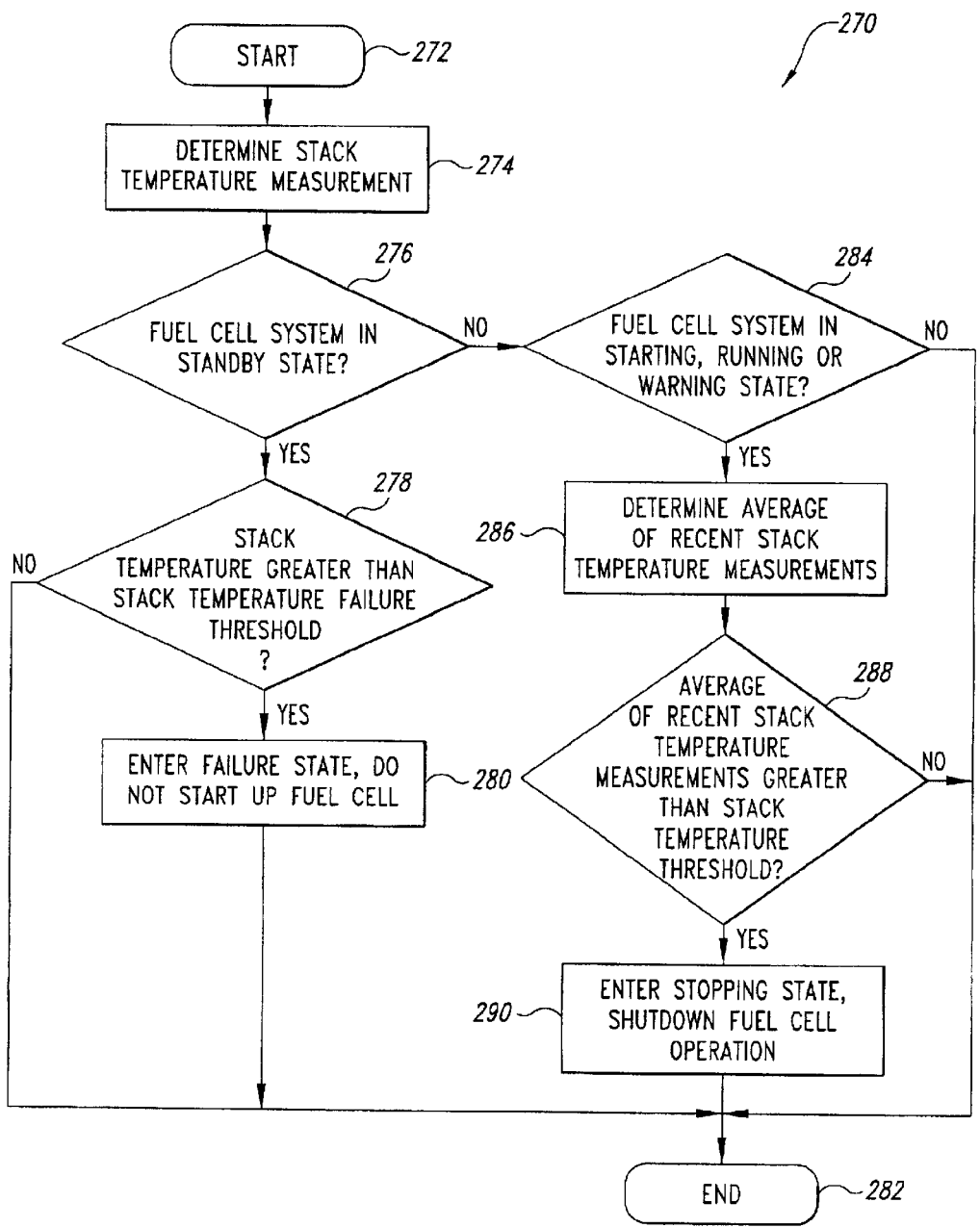
FIG. 16 is a flow diagram showing an exemplary method of monitoring a stack temperature in the fuel cell system of FIGS. 1 and 2, and stopping fuel cell system operation if the stack temperature exceeds a stack temperature failure threshold.

FIG. 16 shows an exemplary method 270 of monitoring the stack temperature of the fuel cell stack 12 and stopping fuel cell system operation if the stack temperature becomes excessive, starting in step 272. In step 274, the microcontroller 40 determines the stack temperature. For example, the microcontroller 40 may receive a stack temperature measurement from the stack fuel cell temperature sensor S1. The microcontroller 40 may sample or read the stack temperature every one-thousand microseconds.

In step 276, the microcontroller 40 determines if the fuel cell system 10 is in a standby state. If the fuel cell system 10 is in a standby state, the microcontroller 40 determines in step 287 if the stack temperature is greater than a stack temperature failure threshold. If the stack temperature is not greater than the stack temperature failure threshold, the microcontroller 40 terminates the stack temperature monitoring method 270 in step 282. If the stack temperature is greater than the stack temperature failure threshold, the microcontroller 40 stops the fuel cell system 10 from starting by entering a failure state in step 280. The microcontroller 40 terminates the stack temperature monitoring method 270 in step 282, until the method 270 is executed again, in the normal sequence of operations.

If the fuel cell system 10 is not in a standby state, the microcontroller 40 determines if the fuel cell system 10 is in starting, running, or warning states in step 284. If the fuel cell system 10 is not in starting, running, or warning states, the microcontroller 40 terminates the method 270 in step 282, until the method 270 is executed again, in the normal sequence of operations. If the fuel cell system 10 is in either a starting, running, or warning state, the microcontroller 40 determines the average of the recent stack temperature measurements, in step 286. In step 288, the microcontroller 40 determines if the average of the recent stack temperature measurements is greater than the stack temperature failure threshold. A suitable stack temperature failure threshold for the described embodiment is approximately 73° C. If the average of the recent stack temperature measurements is not greater than the stack temperature failure threshold, the microcontroller 40 terminates the stack temperature monitoring method 270 in step 282, until the method 270 is executed again, in the normal sequence of operations.

If the average of the recent stack temperature measurements is greater than the stack temperature failure threshold, the microcontroller 40 enters a failure state in step 290, immediately stopping operation of the fuel cell stack 12 and writing a respective fault condition code to the persistent memory 42. The microcontroller 40 does not set the non-restartable status flag in the persistent memory 42 since this fault is a restartable failure. The microcontroller 40 then terminates the stack temperature monitoring method 270 in step 282, until the method 120 is executed again, in the normal sequence of operations. Otherwise, the microcontroller 40 passes control directly to step 282 to terminate the execution of the stack temperature monitoring method 270 until the method 120 is executed again, in the normal sequence of operations.

Figure 17:
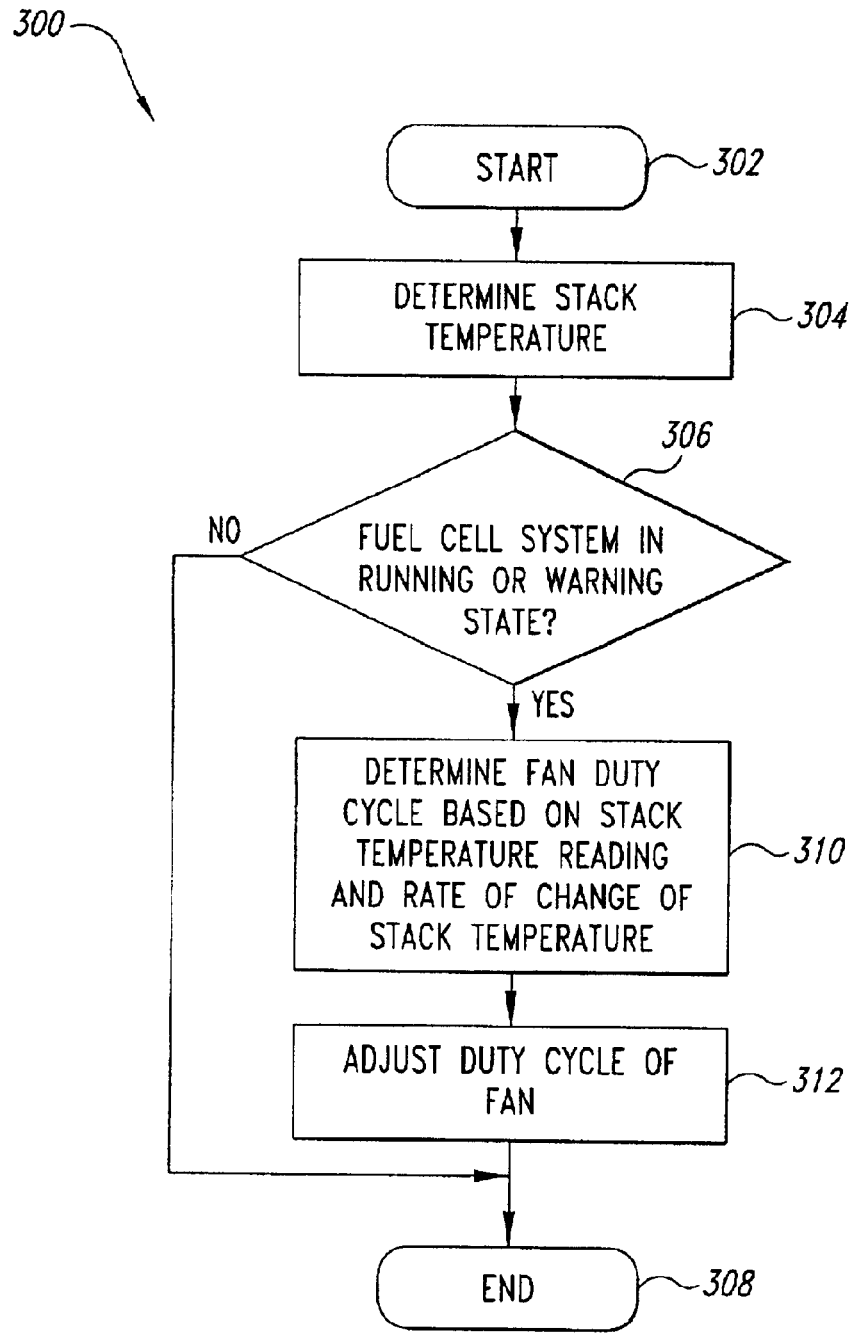
FIG. 17 is a flow diagram of an exemplary method of monitoring a stack temperature of the fuel cell system of FIGS. 1 and 2, and adjusting cooling of the fuel cell stack in response.

FIG. 17 shows an exemplary method of monitoring and controlling the stack temperature 300, starting in step 302. In step 304, the microcontroller 40 determines a stack temperature for the fuel cell stack 12. For example, the microcontroller 40 may receive a stack temperature reading from the stack temperature sensor S1.

In step 306, the microcontroller 40 determines whether the fuel cell system 10 is in either a running or warning state. If the fuel cell system 10 is not in either a running or warning state, the microcontroller 40 terminates the stack temperature monitoring and control method 300, in step 308, until the method 300 is executed again, in the normal sequence of operations. If the fuel cell system 10 is in either a running or warning state, the microcontroller 40 determines a fan duty cycle based on the stack temperature reading and/or a rate of change of the stack temperature, in step 310. In step 312, the microcontroller 40 adjusts the duty cycle of the fan. The microcontroller 40 adjust the duty cycle every one-thousand microseconds. The microcontroller 40 then terminates the stack temperature monitoring and control method 300, in step 308, until the method 300 is executed again, in the normal sequence of operations.

Figure 18:
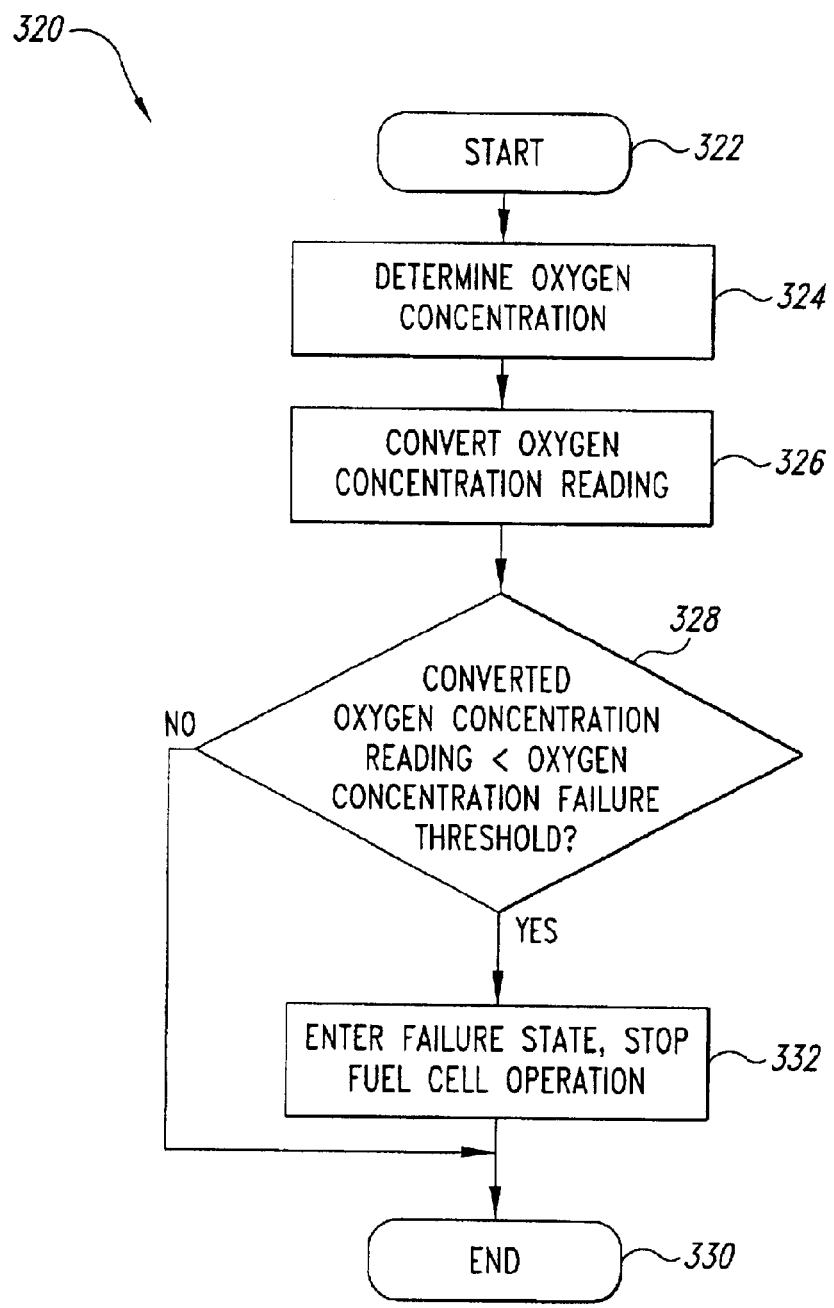
FIG. 18 is a flow diagram of an exemplary method of monitoring an oxygen concentration in an ambient atmosphere surrounding the fuel cell system of FIGS. 1 and 2, and stopping fuel cell system operation if the oxygen concentration is below an oxygen concentration failure threshold.

FIG. 18 shows an exemplary method 320 of monitoring oxygen concentration in the fuel cell system 10 and stopping the fuel cell system operation if the oxygen concentration falls below an oxygen concentration failure threshold, starting in step 322. In step 324, the microcontroller 40 determines the oxygen concentration in the ambient atmosphere. For example, the microcontroller 40 may receive an oxygen concentration measurement or reading from the oxygen concentration sensor S7. The microcontroller 40 may sample or read the oxygen concentration every one-thousand microseconds.

In step 320, the microcontroller 40 converts the oxygen concentration reading employing linear scaling constants for transforming the reading from the oxygen concentration sensor S7. The oxygen concentration is expressed as a percentage of a unit volume of air, and linear scaling constants can be calibrated at the factory for each individual fuel cell stack 12. The constants can be programmed in a configuration data segment in the persistent memory 42, such as an internal EEPROM of the microcontroller 40. Additionally, the microcontroller 40 can perform a CRC-16 checksum over the EEPROM configuration data segment to ensure the continued integrity of these constants. The checksum is recomputed at regular intervals as part of the fuel cell system's self-test suite, and compared with the value recorded in the EEPROM header which, itself, is protected by a similar CRC-16 checksum.

In step 328, the microcontroller 40 determines whether the converted oxygen concentration reading is less than an oxygen concentration failure threshold. A suitable oxygen concentration failure threshold for the discussed embodiment is approximately 18%. If the converted oxygen concentration reading is not less than the oxygen concentration failure threshold, the microcontroller 40 terminates the oxygen concentration monitoring method 320 in step 330. If the converted oxygen concentration reading is less than the oxygen concentration failure threshold, the microcontroller 40 enters a failure state in step 332, immediately stopping operation of the fuel cell stack 12 and writing a respective fault condition code to the persistent memory 42. The microcontroller 40 does not set the non-restartable status flag in the persistent memory 42 since this fault is a restartable failure. The microcontroller 40 then terminates the oxygen concentration monitoring method 320 in step 330, until the method 320 is executed again, in the normal sequence of operations. Otherwise, the microcontroller 40 passes control directly to step 330 to terminate the execution of the oxygen concentration monitoring method 320, until the method 320 is executed again, in the normal sequence of operations.

The oxygen concentration threshold value is set at approximately 18%, where a concentration greater than this limit is necessary to support human health. This concentration value is also the threshold that will, in the presence of hydrogen dissipation from the fuel cell system 10 of not greater than a critical leak rate, result in the fuel cell system 10 shutting down due to oxygen depletion to 18% before achieving a hydrogen concentration of 4% in the local atmosphere. (The lower flammability limit for hydrogen, which is the point at which hydrogen becomes dangerous, is equal to approximately 4% in the atmosphere.) The hydrogen concentration threshold is set at 1%, significantly below the flammability limit for hydrogen (i.e., 4%). In a worse case scenario, i.e., for a small room such as a closet having dimensions 36×40×96 inches with relatively low air exchange of .05 air exchanges/hour ("ACH"), the critical leak rate is approximately 1 liter/minute. Thus, oxygen monitoring can serve as a backup for hydrogen monitoring, described below, if the anticipated or expected dissipation of hydrogen from the fuel cell system 10, for example from controlled purging and/or from anticipated leaks, is maintained at a level below the critical leak rate. The fuel cell system 10 can employ larger critical leak rates if it is certain that the fuel cell system will operate in larger rooms and/or in rooms with higher air exchange rates than set out for the worse case scenario, above. An oxygen concentration of 18% is greater than a critical limit of oxygen concentration required to support human life.

Figure 19:
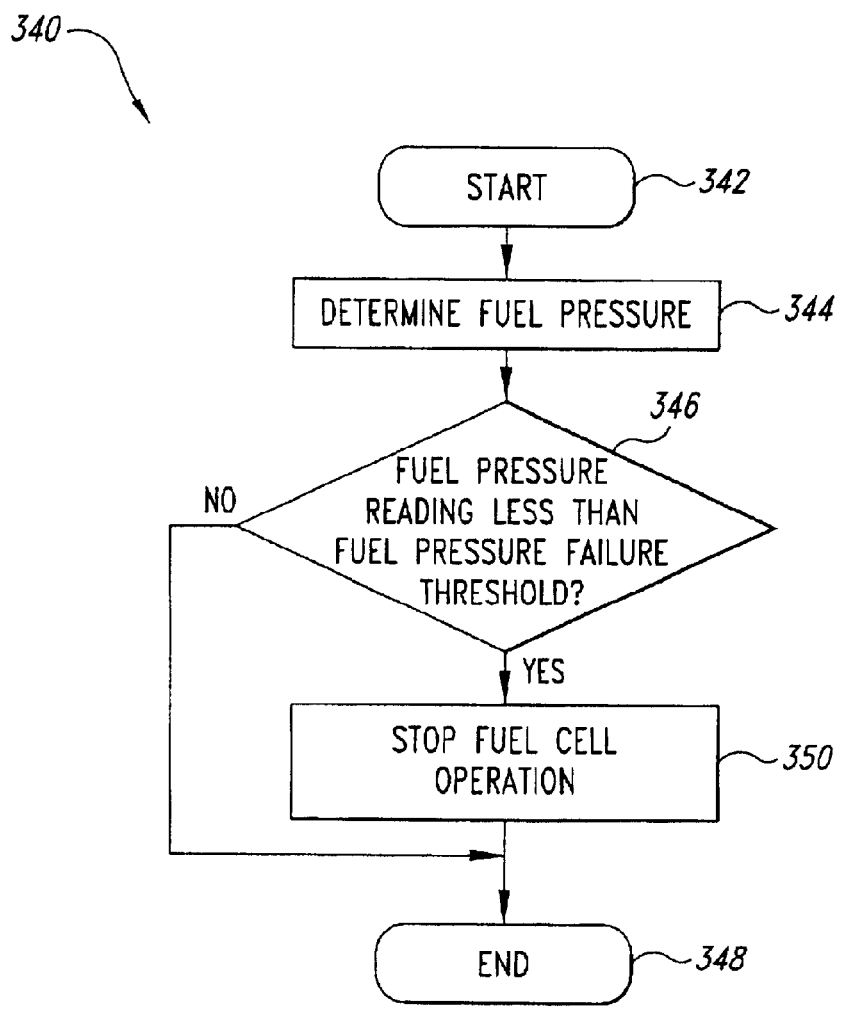
FIG. 19 is a flow diagram of an exemplary method of monitoring a fuel pressure in a fuel cell system of FIGS. 1 and 2, and stopping fuel cell system operation if the fuel pressure is less than a fuel pressure failure threshold.

FIG. 19 shows an exemplary method 340 of monitoring fuel pressure in the fuel cell system 10 and stopping fuel cell system operation if the fuel pressure is below a fuel pressure failure threshold, starting in step 342. In step 344, the microcontroller 40 determines the fuel pressure. For example, the microcontroller 40 may receive a fuel pressure reading from the fuel pressure sensor 62. The microcontroller 40 may sample or read the fuel pressure every one-thousand microseconds. A suitable fuel pressure failure threshold for the described embodiment is approximately 0.5 Bar.

In step 346, the microcontroller 40 compares the fuel pressure reading to a fuel pressure failure threshold, terminating the method 340 in step 348 if the fuel pressure reading is not less than the fuel pressure threshold. If the fuel pressure reading is less than a fuel pressure threshold, the microcontroller 40 enters a failure state in step 350, immediately stopping operation of the fuel cell stack 12 and writing a respective fault condition code to the persistent memory 42. The microcontroller 40 does not set the non-restartable status flag in the persistent memory 42 since this fault is a restartable failure. The microcontroller 40 then terminates the fuel pressure monitoring method 340 in step 348, until the method 340 is executed again, in the normal sequence of operations. Otherwise, the microcontroller 40 passes control directly to step 348 to terminate the execution of the fuel pressure method 340, until the method 340 is executed again, in the normal sequence of operations.

Figure 20:
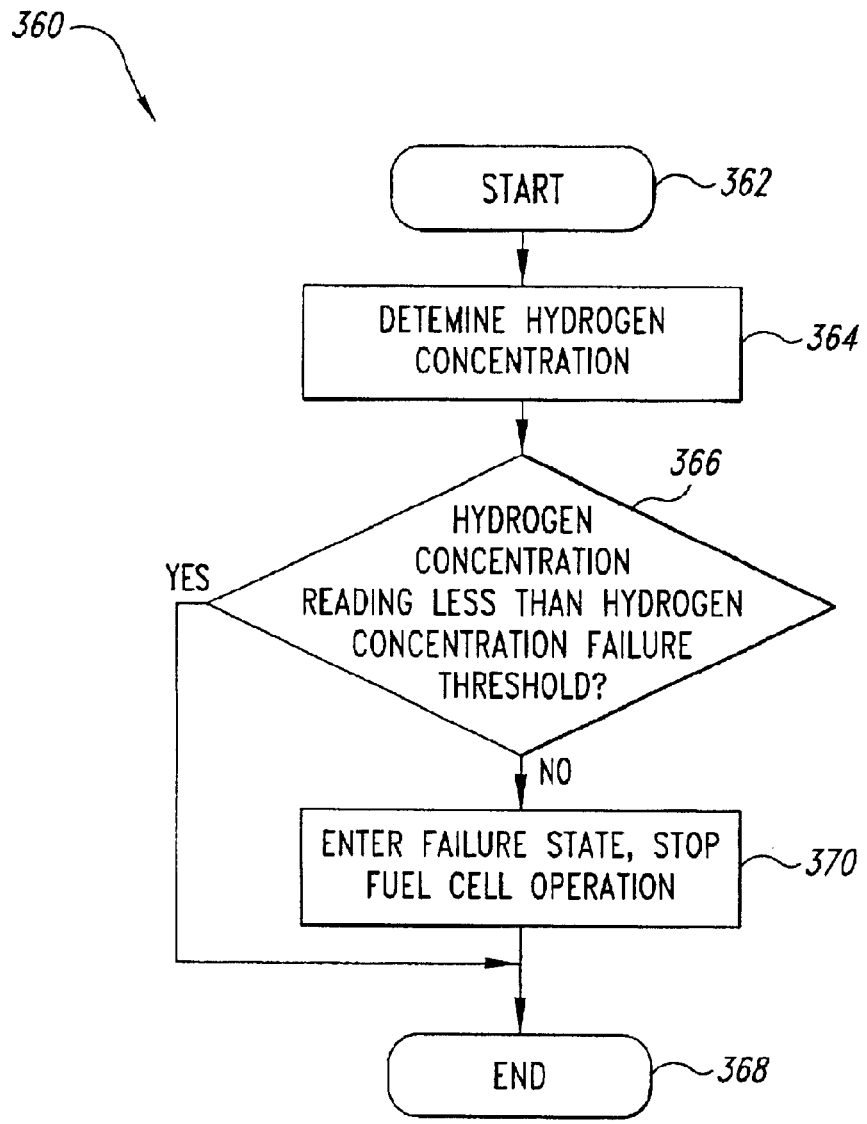
FIG. 20 is a flow diagram of an exemplary method of monitoring a hydrogen concentration in the ambient atmosphere surrounding the fuel cell system of FIGS. 1 and 2, and stopping fuel cell system operation if the hydrogen concentration is greater than a hydrogen concentration failure threshold.

FIG. 20 shows an exemplary method 360 of monitoring hydrogen concentration in the ambient air surrounding the fuel cell stack 12, and stopping fuel cell system operation if the hydrogen concentration exceeds a hydrogen concentration failure threshold, starting in step 362. In step 364, the microcontroller 40 determines a hydrogen concentration. For example, the microcontroller may receive a hydrogen concentration reading from the hydrogen concentration sensor S5. The microcontroller 40 may sample or read the hydrogen concentration every one-thousand microseconds.

In step 366, the microcontroller 40 determines whether the hydrogen concentration reading is less than a hydrogen concentration failure threshold. The microcontroller may read or sample the ambient hydrogen concentration every one-thousand microseconds. A suitable hydrogen concentration failure threshold for the described embodiment is approximately 10,000 parts per million. If the hydrogen concentration reading is less than the hydrogen concentration failure threshold, the microcontroller 40 terminates the hydrogen concentration monitoring method 360 in step 368, until the method 360 is executed again, in the normal sequence of operations. If the hydrogen concentration reading is not less than the hydrogen concentration failure threshold the microcontroller 40 enters a failure state in step 370, immediately stopping operation of the fuel cell stack 12 and writing a respective fault condition code to the persistent memory 42. The microcontroller 40 sets the non-restartable status flag in the persistent memory 42 since this fault is a non-restartable failure. The microcontroller 40 then terminates the hydrogen concentration monitoring method 360 in step 368, until the method 360 is executed again, in the normal sequence of operations.

Figure 21:
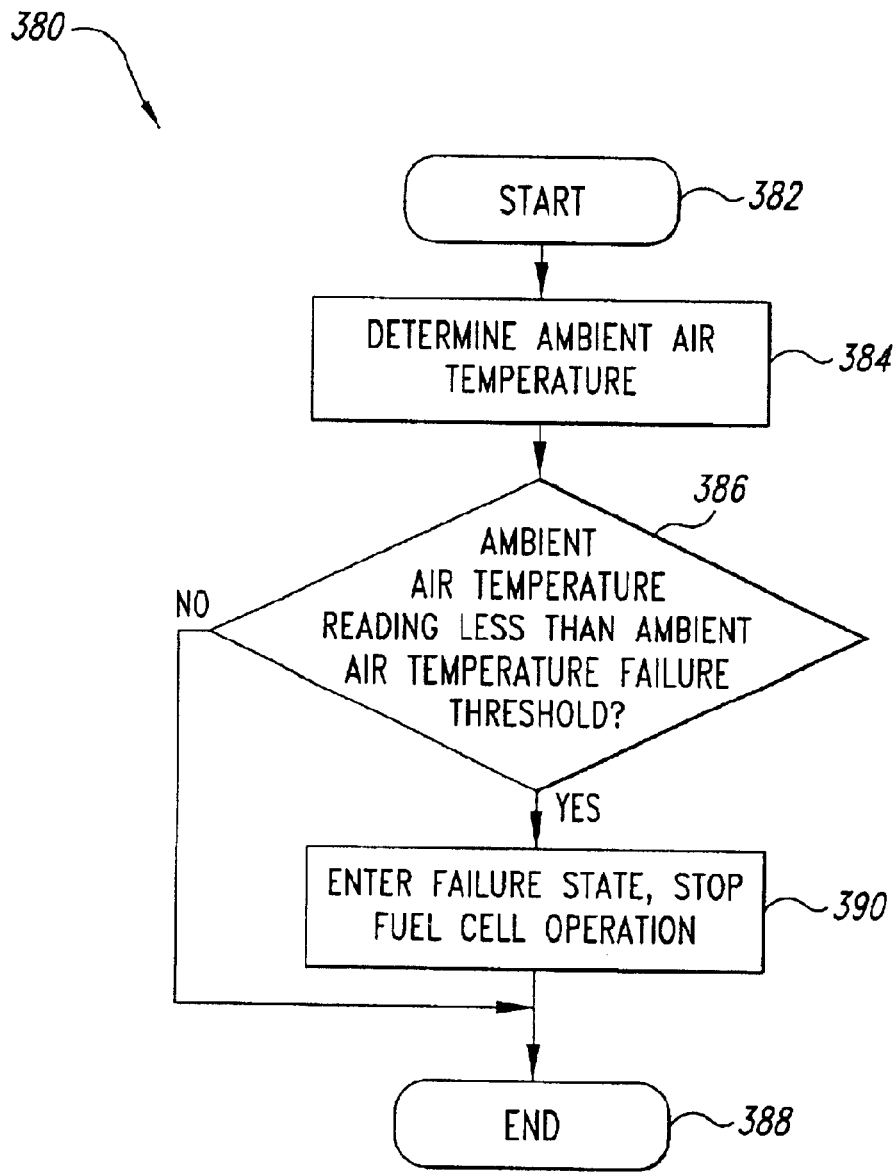
FIG. 21 is a flow diagram of an exemplary method of monitoring a temperature of the ambient air surrounding the fuel cell system of FIGS. 1 and 2, and stopping fuel cell system operation if the ambient air temperature is less than an ambient air temperature failure threshold.

FIG. 21 shows an exemplary method 380 of monitoring the temperature of the ambient air approximate the fuel cell stack 12 and stopping fuel cell operation if the ambient temperature is less than an ambient air temperature threshold, starting in step 382. This prevents the fuel cells from operating in conditions where residual water in the fuel cells may be frozen, thus damaging the fuel cell stack 12.

The microcontroller 40 reads or samples the ambient air temperature every one-thousand microseconds. In step 384, the microcontroller 40 determines a temperature of the ambient air temperature surround the fuel cell system 10. For example, the microcontroller 40 may receive an ambient air temperature reading from the ambient air temperature sensor S10.

In step 386, the microcontroller 40 determines if the ambient air temperature reading is less than an ambient air temperature threshold. A suitable air temperature threshold for the described embodiment is approximately 3° C.

If the ambient air temperature reading is not less than the ambient air temperature threshold, the microcontroller 40 terminates the ambient air temperature monitoring method 380 in step 388, until the method 380 is executed again, in the normal sequence of operations. If the ambient air temperature reading is less than the ambient air temperature threshold, the microcontroller 40 enters a failure state in step 390, immediately stopping operation of the fuel cell stack 12 and writing a respective fault condition code to the persistent memory 42. The microcontroller 40 does not set the non-restartable status flag in the persistent memory 42 since this fault is a restartable failure. The microcontroller 40 then terminates the ambient air temperature monitoring method 380 in step 388, until the method 380 is executed again, in the normal sequence of operations.

Figure 22:
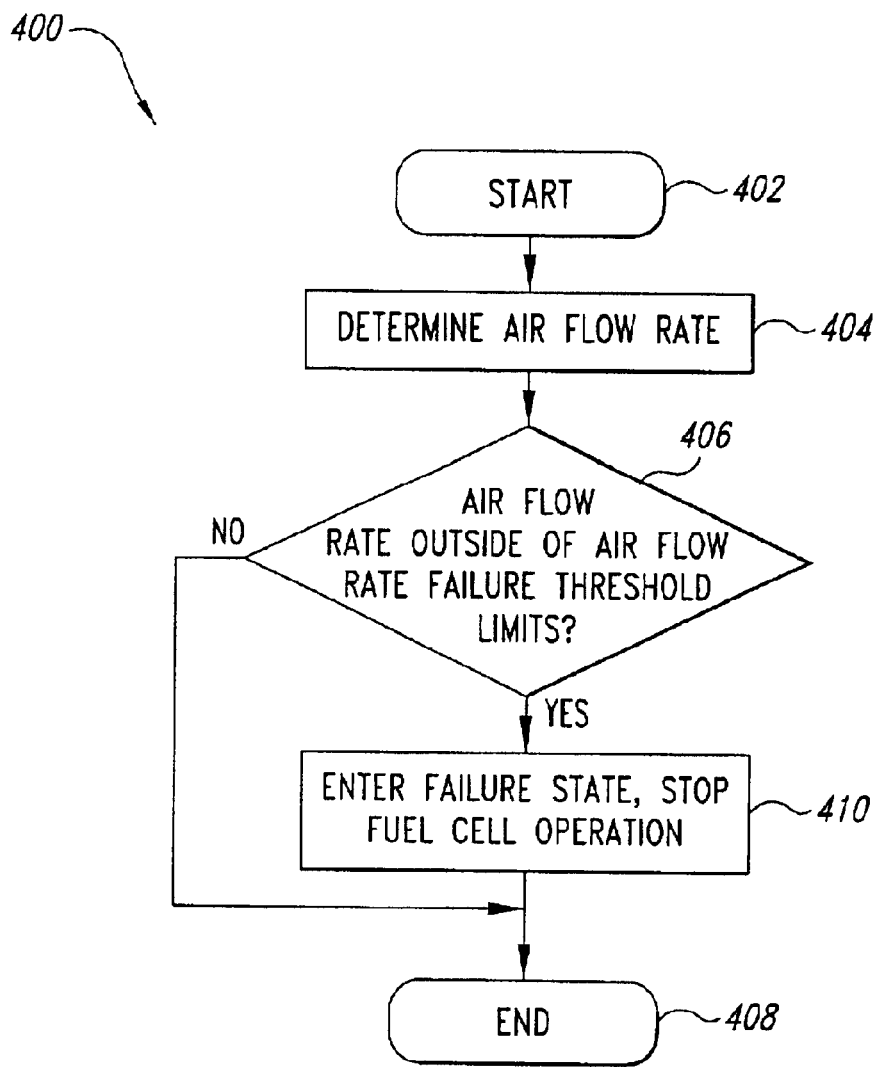
FIG. 22 is a flow diagram of an exemplary method of monitoring an airflow rate through the fuel cell system of FIGS. 1 and 2, and stopping fuel cell system operation if the air flow rate is outside of an air flow failure threshold range.

FIG. 22 shows an exemplary method 400 of monitoring airflow rate through the fuel cell stack 12, and stopping fuel cell system operation if the airflow rate is below an airflow rate failure threshold, starting in step 402. In step 404, the microcontroller 40 determines an airflow rate for air flow through the fuel cell stack 12. For example, the microcontroller 40 may receive an air flow rate measurement from the mass airflow sensor S8. In the described embodiment, the microcontroller 40 reads or samples the airflow rate every one-thousand microseconds.

In step 406, the microcontroller 40 determines if the airflow rate measurement is outside of an air flow rate failure threshold range. If the airflow measurement is not outside of the air flow rate failure threshold range, the microcontroller 40 terminates the air flow rate monitoring method 400 in step 408. If the airflow rate is outside of the air flow rate failure threshold range, the microcontroller 40 enters a failure state in step 410, immediately stopping operation of the fuel cell stack 12 and writing a respective fault condition code to the persistent memory 42. The microcontroller 40 does not set the non-restartable status flag in the persistent memory 42 since this fault is a restartable failure. The microcontroller 40 then terminates the air flow rate monitoring method 400 in step 408, until the method 400 is executed again, in the normal sequence of operations.

Figure 23A:
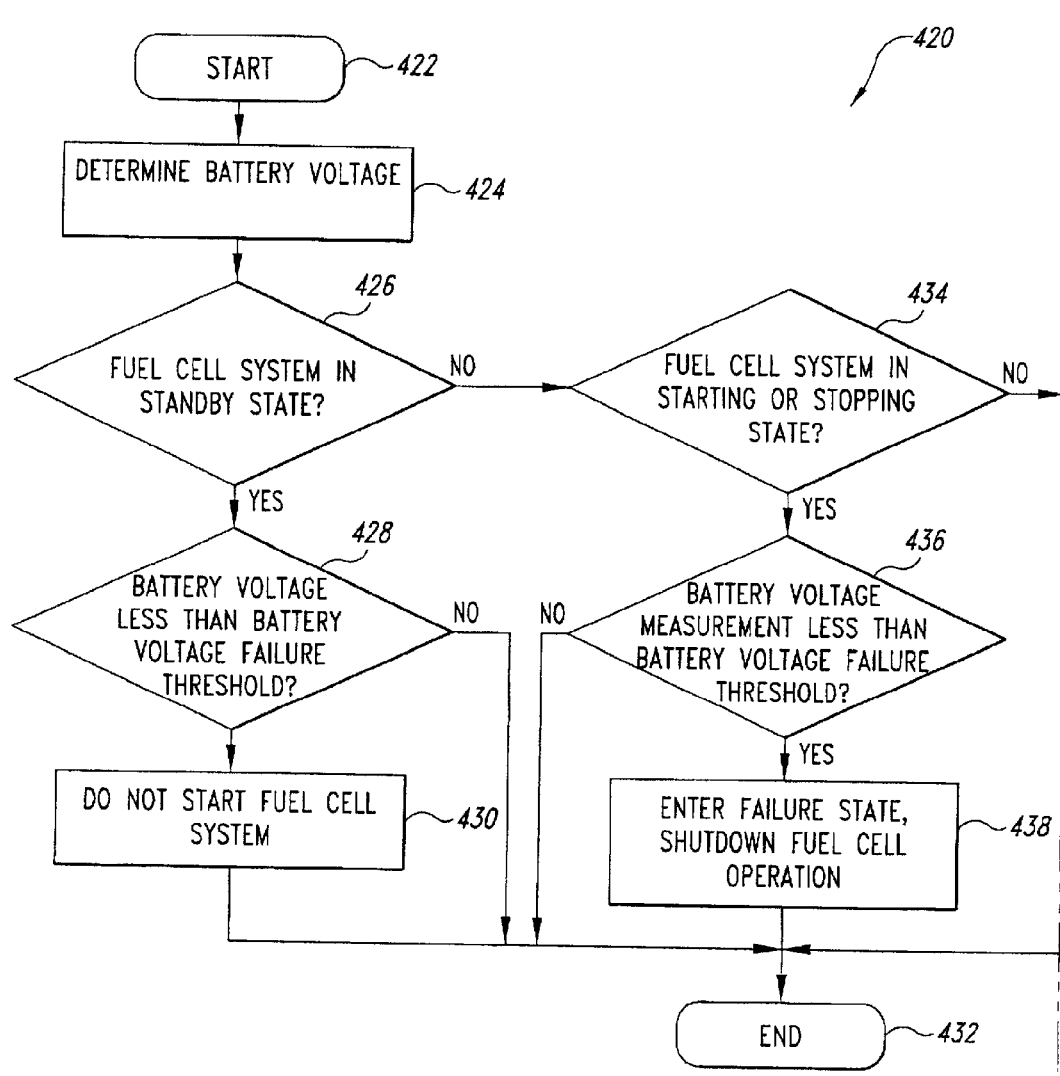
FIGS. 23A and 23B are a flow diagram of an exemplary method of monitoring a battery voltage for a battery in the fuel cell system of FIGS. 1 and 2, and stopping fuel cell system operation if the battery voltage is less than a battery voltage failure threshold.
Figure 23B:
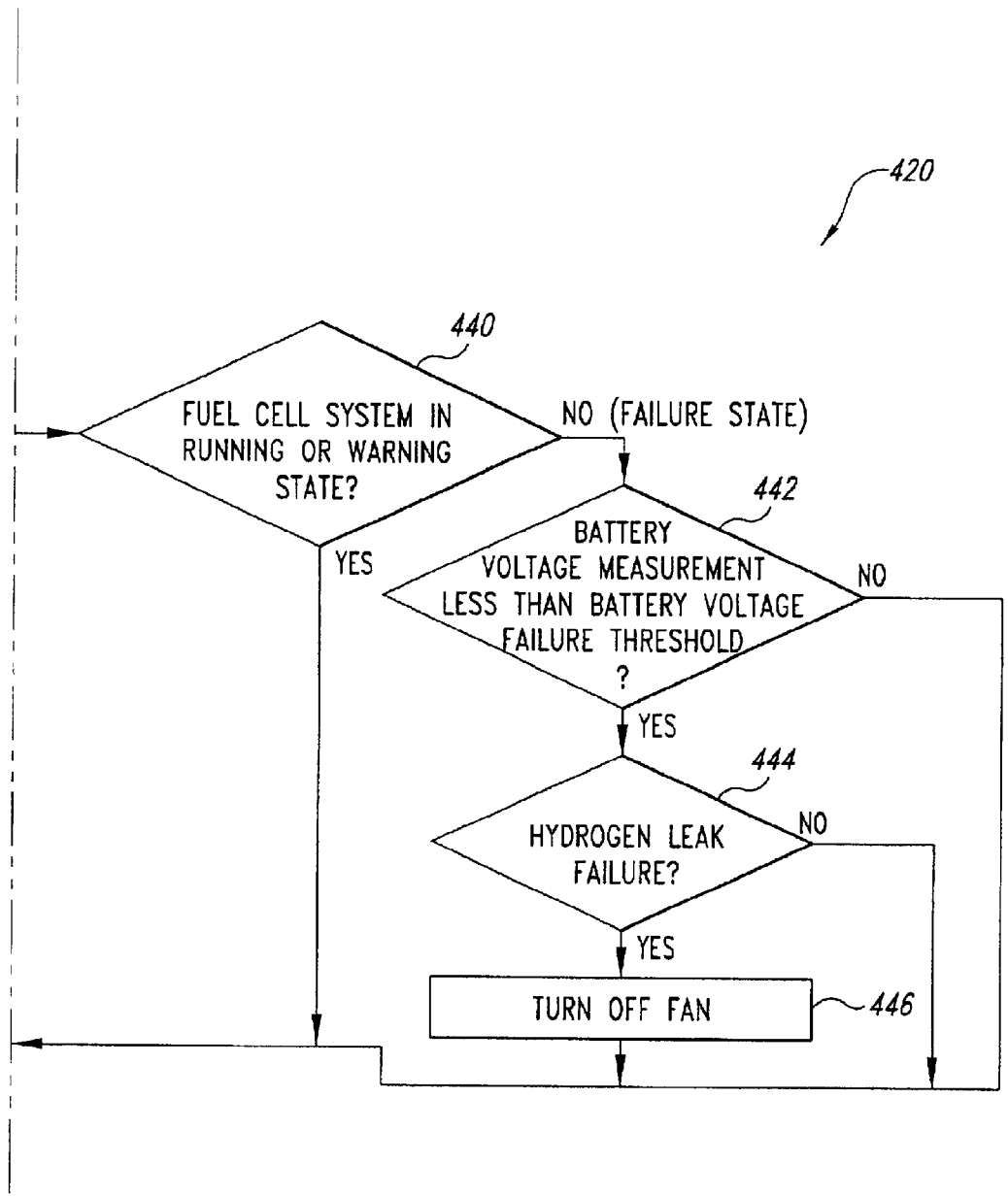

FIGS. 23A and 23B show an exemplary method 420 of monitoring battery voltage in the fuel cell system 10 and stopping fuel cell system operation if the battery voltage is less than a battery voltage threshold, starting in step 422. The battery 47 provides power to the control system and various components of the fuel cell system 10 when the fuel cell stack 12 is not providing power to the fuel cell system 10. The microcontroller 40 determines the battery voltage in step 424. For example, the microcontroller 40 may receive a battery voltage measurement from a battery voltage sensor (not shown). The microcontroller 40 may sample or read the battery voltage every one-thousand microseconds.

In step 426, the microcontroller 40 determines whether the fuel cell system 10 is in a standby state. If the fuel cell system 10 is in a standby state, the microcontroller 40 determines whether the battery voltage measurement is less than a battery voltage failure threshold in step 428. A suitable battery voltage failure threshold for the described embodiment may be approximately 18V.

If the battery voltage measurement is less than the battery voltage failure threshold, the microcontroller 40 prevents the fuel cell system 10 from entering a start state from a standby state, as indicated in step 430, and writes a respective fault condition code to the persistent memory 42. The microcontroller 40 then terminates the battery voltage monitoring method 420 in step 432, until the method 420 is executed again, in the normal sequence of operations. If the battery voltage measurement is not less than the battery voltage failure threshold, the microcontroller 40 passes control directly to step 432, allowing the fuel cell system 10 to begin operation by entering a starting state.

If the microcontroller 40 determines in step 426 that the fuel cell system 10 is not in a standby state, the microcontroller 40 determines if the fuel cell system 10 is in either a starting or stopping state in step 434. If the fuel cell system 10 is in either a starting or stopping state, the microcontroller 40 determines if the battery voltage measurement is less than the battery voltage failure threshold in step 436. If the battery voltage measurement is less than the battery voltage failure threshold, the microcontroller 40 enters a failure state in step 438, immediately stopping operation of the fuel cell stack 12 and writing a respective fault condition code to the persistent memory 42. The microcontroller 40 does not set the non-restartable status flag in the persistent memory 42 since this fault is a restartable failure. The microcontroller 40 then terminates the battery voltage monitoring method 420 in step 432, until the method 420 is executed again, in the normal sequence of operations. If the microcontroller 40 determines that the battery voltage measurement is not less than the battery voltage threshold in step 436, the microcontroller 40 terminates the method 420 in step 432.

If the microcontroller 40 determines in step 434 that the fuel cell system 10 is not in either a starting or stopping state, the microcontroller 40 determines if the fuel cell system 10 is in either a running or warning state in step 440. If the fuel cell system 10 is in either a running or warning state, the fuel cell system 10 is receiving power form the fuel cell stack 12 and there is no need to check the battery voltage. Thus, the microcontroller 40 passes control directly to step 432 to terminate the battery voltage monitoring method 420.

If the microcontroller 40 determines that the fuel cell system 10 is not in either a running or warning state in step 440, then the fuel cell system 10 must be operating in a failure state. In step 442, the microcontroller 40 determines whether the battery voltage measurement is less than the battery voltage failure threshold. If the battery voltage measurement is less than the battery voltage failure threshold, in step 444 the microcontroller 40 determines whether a failure state was caused by a high hydrogen concentration condition. Typically, in a failure state the air compressor, cooling fan, and actuators have all been turned OFF, except in the case of a hydrogen leak. In the case of a hydrogen leak the cooling fan continues to run for approximately two minutes in an attempt to dissipate a local concentration of hydrogen. If the microcontroller 40 determines that a failure state was caused by a hydrogen leak, the microcontroller 40 immediately turns the fan off in step 446 and terminates the method 420 in step 432. If a failure state was not caused by a hydrogen leak, the microcontroller 40 passes control directly to step 432, terminating the battery voltage monitoring method 420, until the method 420 is executed again, in the normal sequence of operations. It is noted that in steps 430 and 438 the microcontroller 40 can set an appropriate fault condition code and/or flag to indicate that the fault was a low battery voltage condition. However, where a hydrogen leak was earlier detected, the cause of the original failure continues to be reported, not the subsequent low battery voltage fault.

Figure 24:
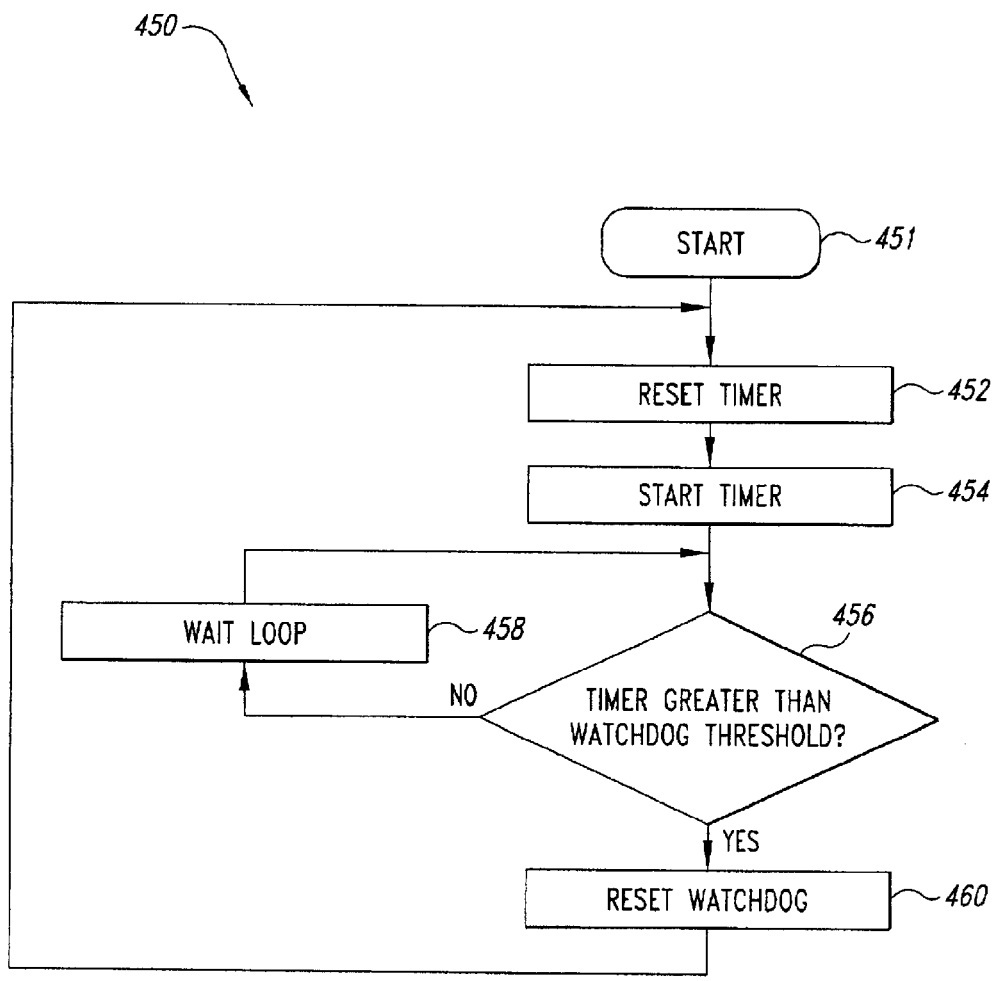
FIG. 24 is a flow diagram of an exemplary method of resetting a watchdog for the fuel cell system of FIGS. 1 and 2.

FIG. 24 shows a watchdog method 450 starting in step 451. An onboard watchdog circuit is toggled every 200 microseconds. If it is not toggled at a rate of at least one-quarter hertz, the watchdog circuitry drives a reset line LOW to reset the microcontroller 40. The circuit prevents software faults from resulting in non-terminating loops or the transfer of program control out of the bounds, and also prevents microelectronic hardware faults from resulting in the program counter becoming stuck.

In step 452, the microcontroller 40 resets a timer. In step 454, the microcontroller 40 starts the timer. In step 456, the microcontroller 40 determines whether the timer is greater than the watchdog threshold. If the timer is not greater than the watchdog threshold, the microcontroller 40 executes a wait loop 458, returning control to step 456. If the timer is greater than the watchdog threshold, the microcontroller 40 rests the watchdog in step 460.

Although specific embodiments, and examples for, the invention are described herein for illustrative purposes, various equivalent modifications can be made without departing from the spirit and scope of the invention, as will be recognized by those skilled in the relevant art. The teachings provided herein of the invention can be applied to other fuel cell systems, not necessarily the PME fuel cell system described above.

Commonly assigned U.S. patent application Ser. No. 09/916,241, entitled "FUEL CELL AMBIENT ENVIRONMENT MONITORING AND CONTROL APPARATUS AND METHOD"; Ser. No. 09/916,117, entitled "FUEL CELL CONTROLLER SELF INSPECTION"; Ser. No. 09/916,115, entitled "FUEL CELL ANOMALY DETECTION METHOD AND APPARATUS"; Ser. No. 09/916,211, entitled "FUEL CELL PURGING METHOD AND APPARATUS"; Ser. No. 09/916,213, entitled "FUEL CELL RESUSCITATION METHOD AND APPARATUS"; Ser. No. 09/916,239, entitled "FUEL CELL SYSTEM AUTOMATIC POWER SWITCHING METHOD AND APPARATUS"; Ser. No. 09/916,118, entitled "PRODUCT WATER PUMP FOR FUEL CELL SYSTEM"; and Ser. No. 09/916,212, entitled "FUEL CELL SYSTEM HAVING A HYDROGEN SENSOR," all filed Jul. 25, 2001, are incorporated herein by reference, in their entirety.

The various embodiments described above and in the applications and patents incorporated herein by reference can be combined to provide further embodiments. The described methods can omit some acts and can add other acts, and can execute the acts in a different order than that illustrated, to achieve the advantages of the invention.

These and other changes can be made to the invention in light of the above detailed description. In general, in the following claims, the terms used should not be construed to limit the invention to the specific embodiments disclosed in the specification, but should be construed to include all fuel cell systems, controllers and processors, actuators, and sensors that operate in accordance with the claims. Accordingly, the invention is not limited by the disclosure, but instead its scope is to be determined entirely by the following claims.

What is claimed is:

1. A control system for a fuel cell assembly, comprising:
an oxygen sensor; and
a switch couplable to the fuel cell assembly and selectively actuatable to stop fuel cell operation in response to a high hydrogen condition indicated by an oxygen reading from the oxygen sensor.

2. The control system of claim 1 wherein the oxygen sensor is located proximate the fuel cell assembly and the switch is coupled to the fuel cell assembly.

3. The control system of claim 1, further comprising a hydrogen sensor, wherein the switch is also selectively actuatable to stop fuel cell operation in response to a high hydrogen condition indicated by a hydrogen reading from the hydrogen sensor.

4. A control system for a fuel cell assembly comprising:
an oxygen sensor;
a hydrogen sensor;
a temperature sensor; and
a switch couplable to the fuel cell assembly and selectively actuatable to stop fuel cell operation in response to at least one of a low oxygen condition indicated by an oxygen reading from the oxygen sensor, a high hydrogen condition indicated by a hydrogen reading from the hydrogen sensor, and a high temperature condition indicated by a temperature reading from the temperature sensor.

5. The control system of claim 4
wherein the switch takes the form of a programmed controller, the programmed controller configured to compare the oxygen reading to a low oxygen threshold value to determine an existence of the low oxygen condition, the hydrogen reading to a high hydrogen threshold value to determine an existence of the high hydrogen condition, and the temperature reading to a high temperature threshold value to determine an existence of the high temperature condition.

6. The control system of claim 1 wherein the switch takes the form of a programmed controller configured to compare the oxygen reading to a low oxygen threshold value of approximately 18 percent to determine an existence of the high hydrogen condition.

7. The control system of claim 4 wherein the switch takes the form of a programmed controller that is configured to compare the oxygen reading to a low oxygen threshold value of approximately 18 percent to determine an existence of the low oxygen condition, the hydrogen reading to a high hydrogen threshold value of approximately 1 percent to determine an existence of the high hydrogen condition.

8. The control system of claim 4
wherein the switch takes the form of a programmed controller that is configured to compare the oxygen reading to a low oxygen threshold value of 18 percent to determine an existence of the high hydrogen condition, the hydrogen reading to a high hydrogen threshold value to determine an existence of the high hydrogen condition, and the temperature reading to a high temperature threshold value the determine an existence of the high temperature condition.

9. The control system of claim 1 wherein the switch takes the form of a programmed controller and at least one actuator coupled to the programmed controller for control thereby.

10. A fuel cell system for use in a habitable environment, comprising:
at least one fuel cell;
an oxygen sensor;
a hydrogen sensor; and
a first switch selectively actuatable to stop fuel cell operation in response to at least one of a high hydrogen condition indicated by at least one of a hydrogen reading from the hydrogen sensor and an oxygen reading from the oxygen sensor wherein in the first switch comprises a controller that compares the oxygen reading to a low oxygen threshold value corresponding to a first hydrogen concentration, and further comprising a second switch, comprising a second controller that compares the hydrogen reading to a high hydrogen threshold value corresponding to a second hydrogen concentration equal to or less than the first hydrogen concentration.

11. A fuel cell system for use in a habitable environment, comprising:

at least one fuel cell;

an oxygen sensor;

a hydrogen sensor; and a first switch selectively actuatable to stop fuel cell operation in response to at least one of a high hydrogen condition indicated by at least one of a hydrogen reading from the hydrogen sensor and an oxygen reading from the oxygen sensor wherein in the first switch comprises a controller that compares the oxygen reading to a low oxygen threshold value corresponding to a first hydrogen concentration and that compares the hydrogen reading to a high hydrogen threshold value corresponding to a second hydrogen concentration not greater than the first hydrogen concentration.

12. The fuel cell system of claim 11 wherein in the controller compares the oxygen reading to a low oxygen threshold value of approximately 18 percent and compares the hydrogen reading to a high hydrogen threshold value less than 4 percent, and further comprising an actuator that terminates a flow of fuel to the fuel cell in response to a signal from the controller.

13. The fuel cell system of claim 11 wherein in the controller compares the oxygen reading to a low oxygen threshold value of approximately 18 percent and compares the hydrogen reading to a high hydrogen threshold value of 1 percent, and further comprising an actuator that terminates a flow of fuel to the fuel cell in response to a signal from the controller.

14. The fuel cell system of claim 11 further comprising:

a fuel flow valve; and an actuator that closes the fuel flow valve in response to a signal from the controller.

15. A method of operating a fuel cell assembly, comprising:

determining a concentration of oxygen proximate the fuel cell; and providing fuel to the fuel cell if the determined concentration of oxygen proximate the fuel cell is greater than an oxygen threshold value.

16. The method of claim 15, further comprising setting the oxygen threshold value based on an oxygen concentration value corresponding to a dangerous concentration of hydrogen.

17. The method of claim 15, further comprising setting the oxygen threshold value to approximately 18 percent.

18. The method of claim 15, further comprising:

repeatedly determining the concentration of oxygen proximate the fuel cell; and providing fuel to the fuel cell if the determined concentration of oxygen proximate the fuel cell is greater than the oxygen threshold value.

19. The method of claim 15, further comprising:

repeatedly determining the concentration of oxygen proximate the fuel cell;

comparing the determined concentration of oxygen proximate the fuel cell to the oxygen threshold value; and if the determined concentration of oxygen proximate the fuel cell is not greater than the oxygen threshold value, disconnecting an external load from the fuel cell; and closing at least one fuel value between a fuel source and the fuel cell.

20. The method of claim 15, further comprising:

repeatedly determining the concentration of oxygen proximate the fuel cell;

comparing the determined concentration of oxygen proximate the fuel cell to the oxygen threshold value; and if the determined concentration of oxygen proximate the fuel cell is not greater than the oxygen threshold value, disconnecting an external load from the fuel cell;

closing at least one fuel value between a fuel source and the fuel cell;

closing at least one purge value;

disconnecting stack power;

turning off an air compressor;

turning off a cooling fan;

writing a shutdown code to a non-volatile memory, if a fault occurred; and setting a non-restartable status in the non-volatile memory, if a non-restartable fault occurred.

21. A computer-readable media containing instructions to cause a processor to control operation of a fuel cell assembly, by:

determining a concentration of oxygen proximate the fuel cell assembly; and providing fuel to the fuel cell if the concentration of oxygen proximate the fuel cell assembly is greater than an oxygen threshold value.

22. The computer-readable media of claim 21 containing instructions to cause a processor to control operation of the fuel cell assembly, further by setting the oxygen threshold value based on an oxygen concentration value corresponding to a dangerous concentration of hydrogen.

23. The computer-readable media of claim 21 containing instructions to cause a processor to control operation of the fuel cell assembly, further by setting the oxygen threshold value to approximately 18 percent.

24. The computer-readable media of claim 21 containing instructions to cause a processor to control operation of the fuel cell assembly, further by:

repeatedly determining the concentration of oxygen proximate the fuel cell assembly; and providing fuel to the fuel cell assembly if the determined concentration of oxygen proximate the fuel cell assembly is greater than the oxygen threshold value.

25. The computer-readable media of claim 21 wherein the computer-readable media comprises a memory structure of a micro-controller.

* * * * *

UNITED STATES PATENT AND TRADEMARK OFFICE
CERTIFICATE OF CORRECTION

PATENT NO. : 6,887,606 B2
DATED : May 3, 2005
INVENTOR(S) : Robert Kenneth Parr et al.

It is certified that error appears in the above-identified patent and that said Letters Patent is hereby corrected as shown below:

Title page,
Item [75], Inventors, "Robert Kenneth Parr, Calgary (CA); Brian Wells, Vancouver (CA)" should read as -- Jake de Vaal, Coquitlam (CA); Harvindra Deo, Coquitlam (CA) --.
Item [56], References Cited, U.S. PATENT DOCUMENTS, "5,763,113 A 6/1998" should read as -- 5,763,133 A   6/1998 --.
Item [57], ABSTRACT, "A controller in a fuel cell system performs various operating parameter checks at a predefined schedule, including one or more of a stack current check; a stack voltage check; a cell voltage check; a purge cell check; an oxygen concentration check; a hydrogen concentration check; a stack temperature check; an ambient air temperature check; a fuel pressure check; and an airflow rate check; a hydrogen sensor heater check; a battery voltage check; a microcontroller self-check; and/or toggling a watchdog. The frequency of the checks are set relative to achieve an efficient control of the fuel cell system by selectively distributing the load on the microcontroller." should read as -- A control system for a fuel cell assembly employs an oxygen sensor to monitor oxygen concentration and hydrogen concentration in the ambient environment proximate the fuel cell assembly, compares the monitored values to threshold values, and shuts down fuel cell operation in response to undesirable conditions. --.

Signed and Sealed this

Fourth Day of October, 2005

JON W. DUDAS
*Director of the United States Patent and Trademark Office*